US012804456B2

(12) United States Patent
Fujishiro

(10) Patent No.: US 12,804,456 B2
(45) Date of Patent: Nov. 17, 2026

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 386 days.

(21) Appl. No.: 18/505,758

(22) Filed: Nov. 9, 2023

(65) Prior Publication Data

US 2024/0080710 A1 Mar. 7, 2024

Related U.S. Application Data

(63) Continuation of application No. PCT/JP2022/019570, filed on May 6, 2022.

(30) Foreign Application Priority Data

May 10, 2021 (JP) ................................ 2021-080063

(51) Int. Cl.
*H04W 28/02* (2009.01)

(52) U.S. Cl.
CPC .............................. *H04W 28/0278* (2013.01)

(58) Field of Classification Search
CPC ............ H04W 16/26; H04W 28/0278; H04W 28/14; H04W 72/12; H04W 92/20
See application file for complete search history.

(56) References Cited

U.S. PATENT DOCUMENTS

2021/0250804 A1* 8/2021 Chen ..................... H04W 72/52
2022/0232593 A1 7/2022 Fujishiro et al.
2022/0361082 A1* 11/2022 Wu ....................... H04W 72/40
2024/0349380 A1* 10/2024 Wu ....................... H04W 76/19
2024/0414589 A1* 12/2024 Bergström ........ H04W 28/0278

FOREIGN PATENT DOCUMENTS

WO 2021/065763 A1 4/2021

OTHER PUBLICATIONS

3rd Generation Partnership Project; Technical Specification Group Radio Access Network; NR; NR and NG-RAN Overall Description; Stage 2 (Release 16); 3GPP TS 38.300 V16.3.0; Sep. 2020; pp. 1-148.

* cited by examiner

*Primary Examiner* — Donald L Mills
(74) *Attorney, Agent, or Firm* — Studebaker Brackett PLLC

(57) ABSTRACT

In a first aspect, a communication control method is used in a cellular communication system. The communication control method includes calculating by a first relay node, a buffer size (BS) using a first calculation method among a plurality of calculation methods relating to the buffer size. The communication control method includes transmitting, by the first relay node to a parent node of the first relay node, a pre-emptive Buffer Status Report (BSR) including the buffer size.

11 Claims, 18 Drawing Sheets

COMMUNICATION CONTROL METHOD

RELATED APPLICATIONS

The present application is a continuation based on PCT Application No. PCT/JP2022/019570, filed on May 6, 2022, which claims the benefit of Japanese Patent Application No. 2021-080063 filed on May 10, 2021. The content of which is incorporated by reference herein in their entirety.

TECHNICAL FIELD

The present disclosure relates to a communication control method used in a cellular communication system.

BACKGROUND OF INVENTION

In the Third Generation Partnership Project (3GPP), which is a project for the standardization of cellular communication systems, introducing a new relay node referred to as an Integrated Access and Backhaul (IAB) node (for example, see "3GPP TS 38.300 V16.5.0 (2021-03)") is being considered. One or more relay nodes are involved in communication between a base station and a user equipment and perform relay for the communication between the base station and the user equipment.

SUMMARY

In a first aspect, a communication control method is used in a cellular communication system. The communication control method includes calculating, by a first relay node, a buffer size (BS) using a first calculation method among a plurality of calculation methods related to the buffer size. The communication control method includes transmitting, by the first relay node to a parent node of the first relay node, a pre-emptive Buffer Status Report (BSR) including the buffer size.

In a second aspect, a communication control method is used in a cellular communication system. The communication control method includes receiving, by a relay node from a child node of the relay node, a legacy BSR including a buffer size amount X1. The communication control method includes transmitting, by the relay node to the child node, an uplink grant (UL grant) including a resource amount X2. The communication control method includes receiving, by the relay node, data from the child node and transferring, by the relay node, the data to an IAB-MT of the relay node. The communication control method includes calculating, by the relay node, a buffer size using either (X1−M) or (X2−M), where M is a data amount transferred to the IAB-MT of the relay node. The communication control method includes transmitting, by the relay node, a pre-emptive BSR including the buffer size to a parent node of the relay node.

In a third aspect, a communication control method is used in a cellular communication system. The communication control method includes receiving, by a relay node, a first legacy BSR from a child node of the relay node. The communication control method includes transmitting, by the relay node, an uplink grant (UL grant) to the child node. The communication control method includes receiving, by the relay node, data from the child node. The communication control method includes transmitting, by the relay node to a parent node of the relay node, a second legacy BSR including, in a buffer size, a data amount retained in an IAB-DU of the relay node when the first legacy BSR is received or when the uplink grant is transmitted.

In a fourth aspect, a communication control method is used in a cellular communication system. The communication control method includes dividing, by a relay node, a calculated buffer size into a first buffer size and a second buffer size in accordance with an allocation rate. The communication control method includes, by the relay node, transmitting a first pre-emptive BSR including the first buffer size to a first parent node being a parent node of the relay node, and transmitting a second pre-emptive BSR including the second buffer size to a second parent node being a parent node of the relay node. In the communication control method, a main cell group (MCG) includes the first parent node and a secondary cell group (SCG) includes the second parent node.

Figure 9:
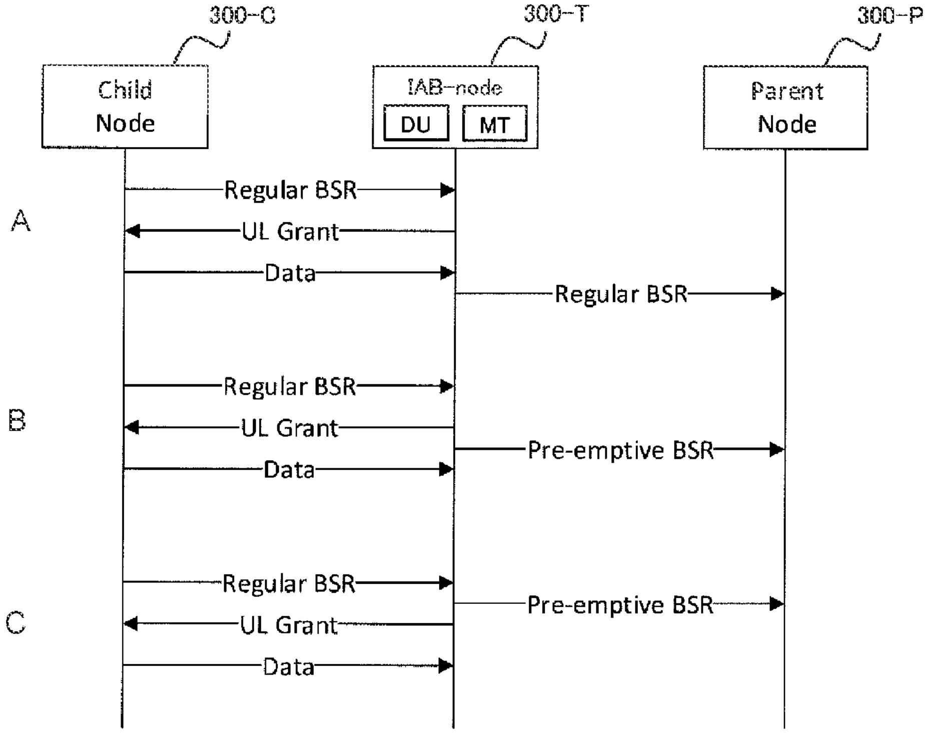

A portion A of FIG. 9 is a diagram illustrating a transmission example of a legacy BSR according to a first embodiment, and portions B and C of FIG. 9 are diagrams each illustrating a transmission example of a pre-emptive BSR according to the first embodiment.

Figure 10:
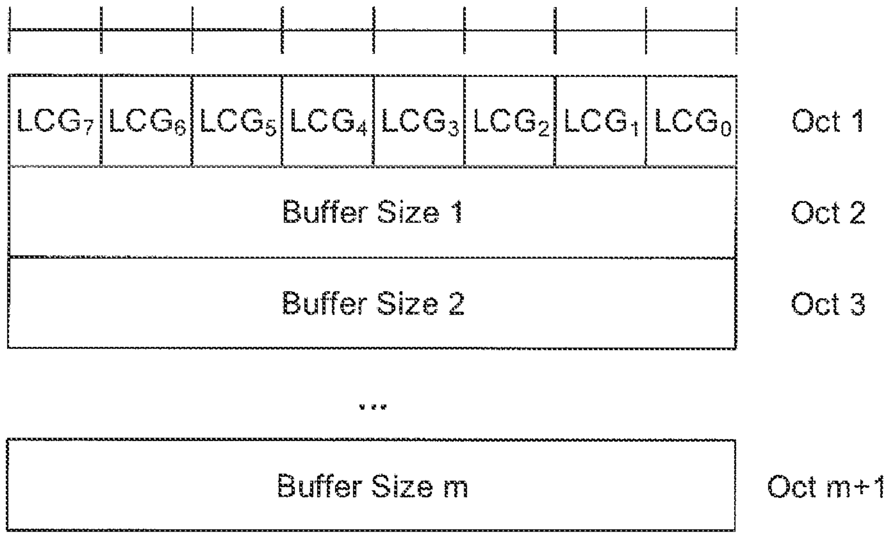

FIG. 10 is a diagram illustrating an example of a pre-emptive BSR MAC CE according to the first embodiment.

Figure 11:
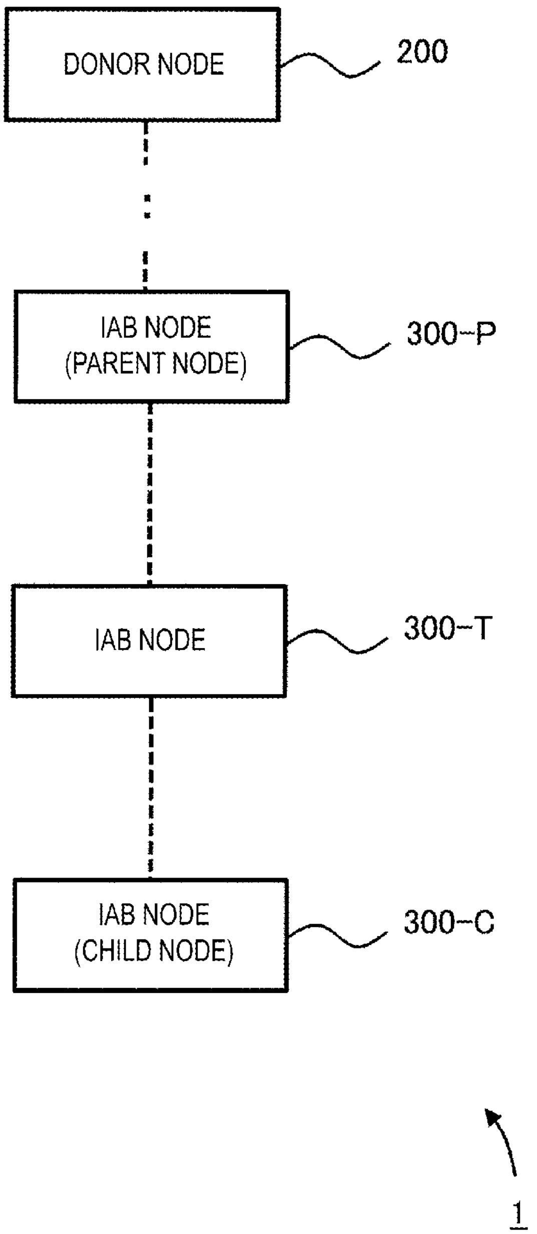

FIG. 11 is a diagram illustrating a configuration example of a cellular communication system according to the first embodiment.

Figure 12:
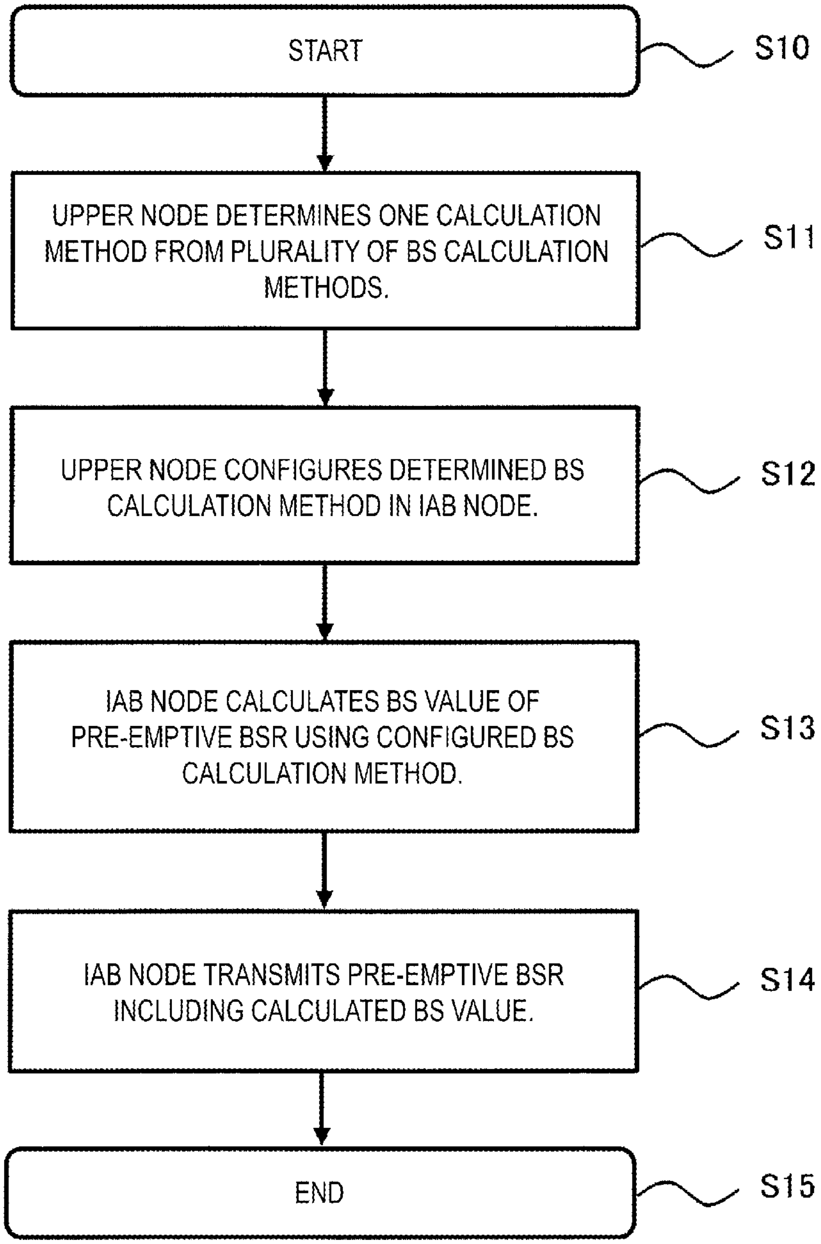

FIG. 12 is a flowchart illustrating an operation example according to the first embodiment.

Figure 13:
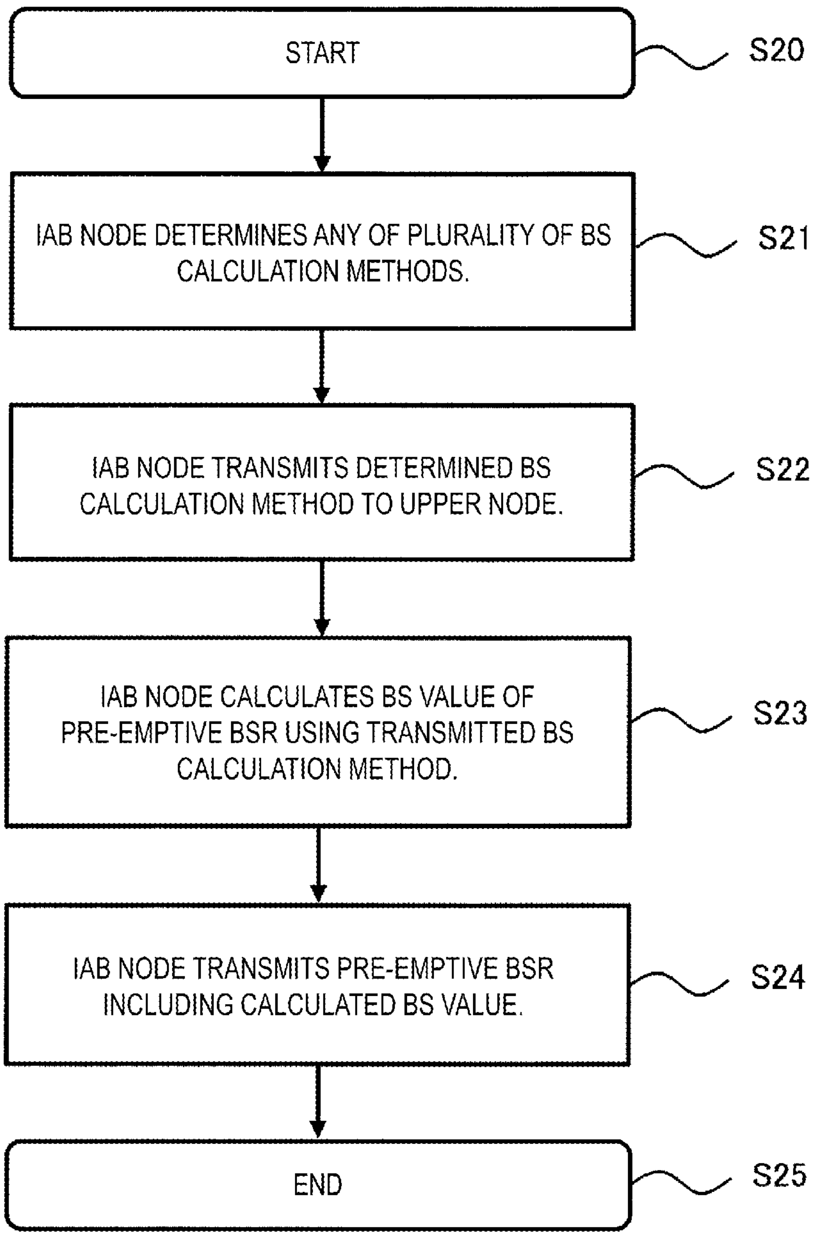

FIG. 13 is a flowchart illustrating an operation example according to Variation 1 of the first embodiment.

Figure 14:
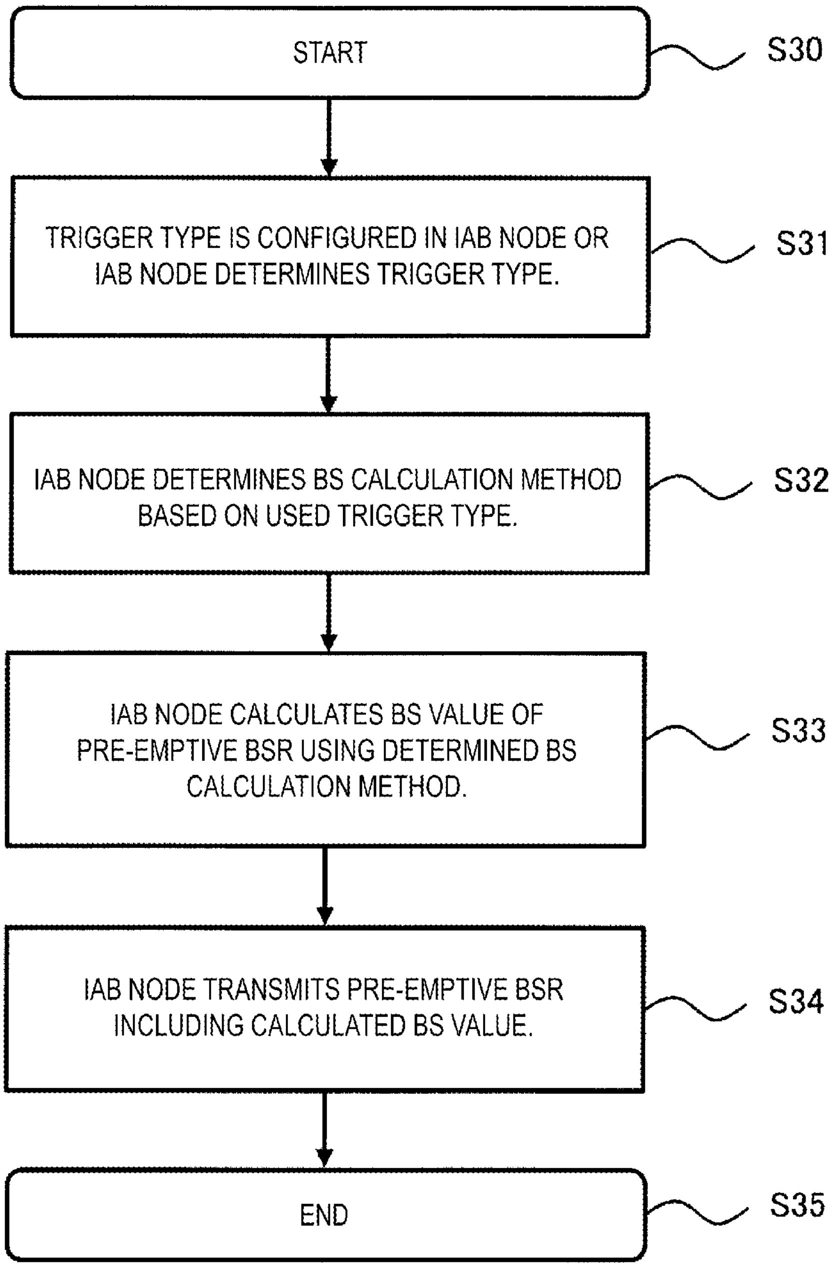

FIG. 14 is a flowchart illustrating an operation example according to Variation 2 of the first embodiment.

Figure 15A:
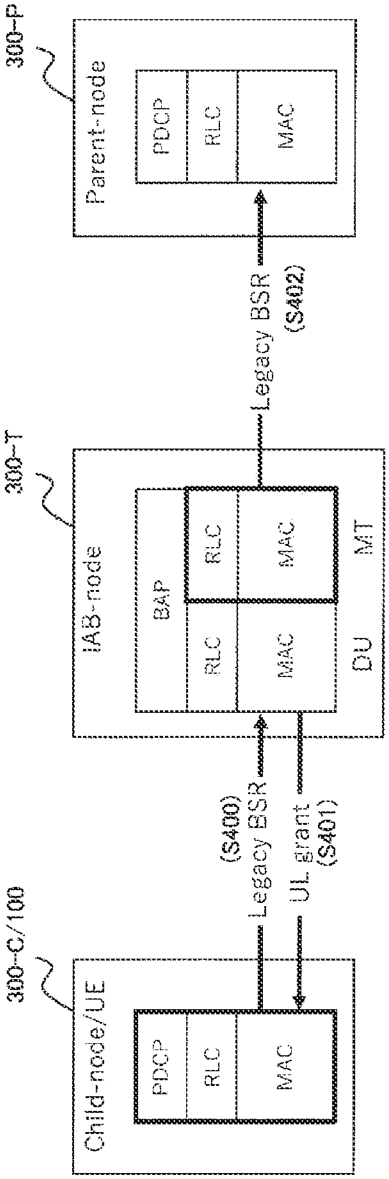
Figure 15B:
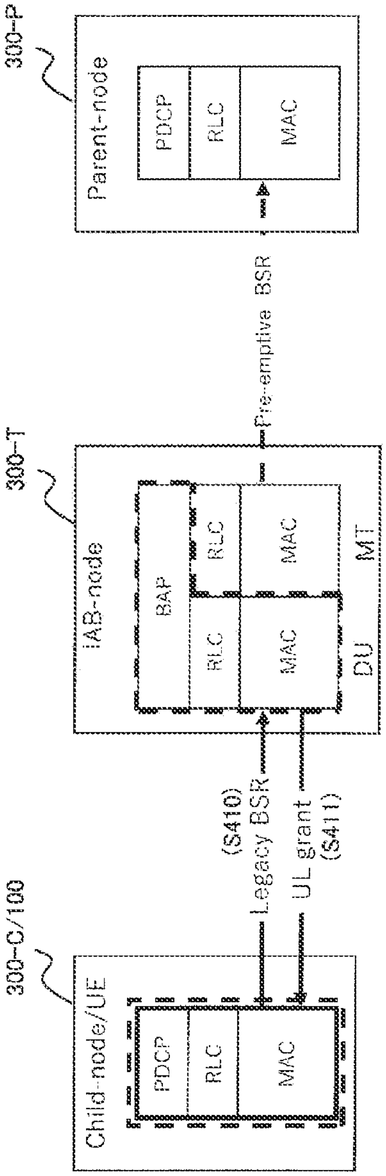

FIG. 15A and FIG. 15B are diagrams each illustrating an example of a target BS according to a second embodiment.

Figure 16:
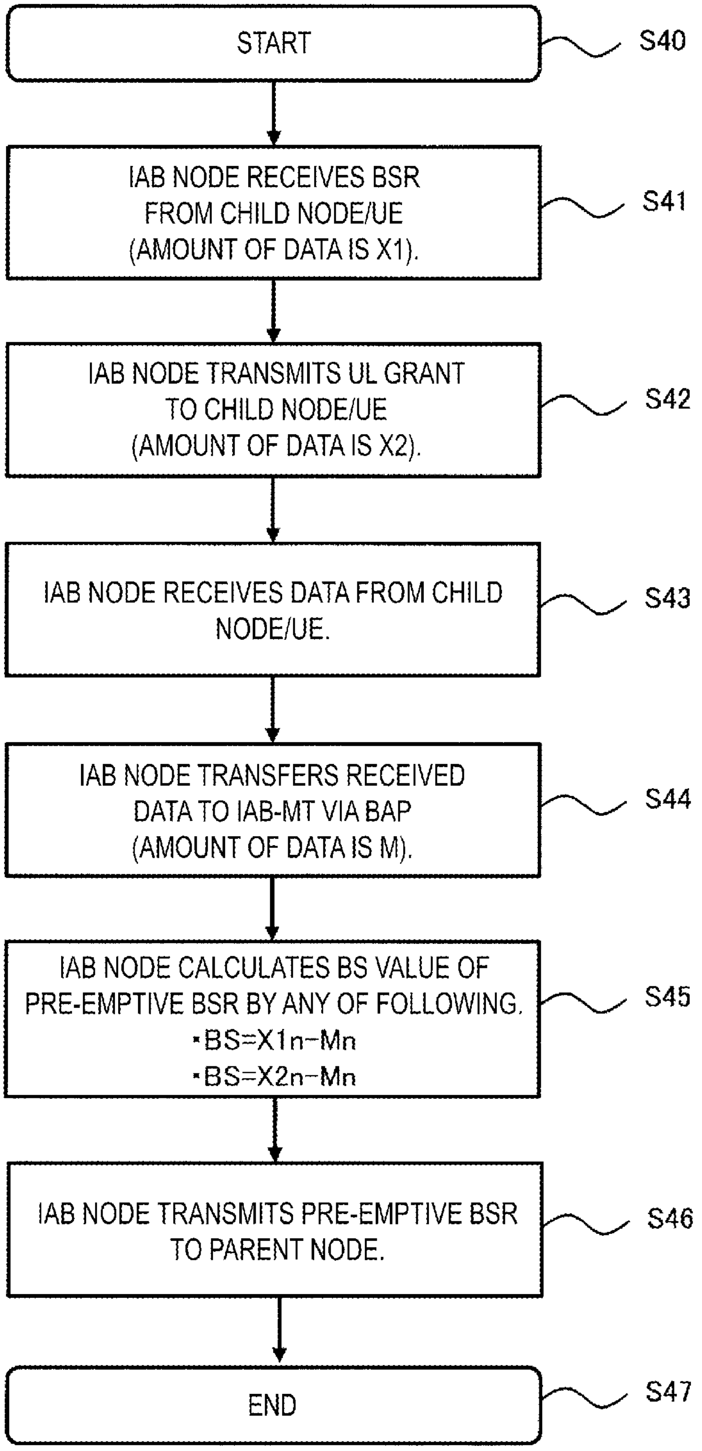

FIG. 16 is a flowchart illustrating an operation example according to the second embodiment.

Figure 17:
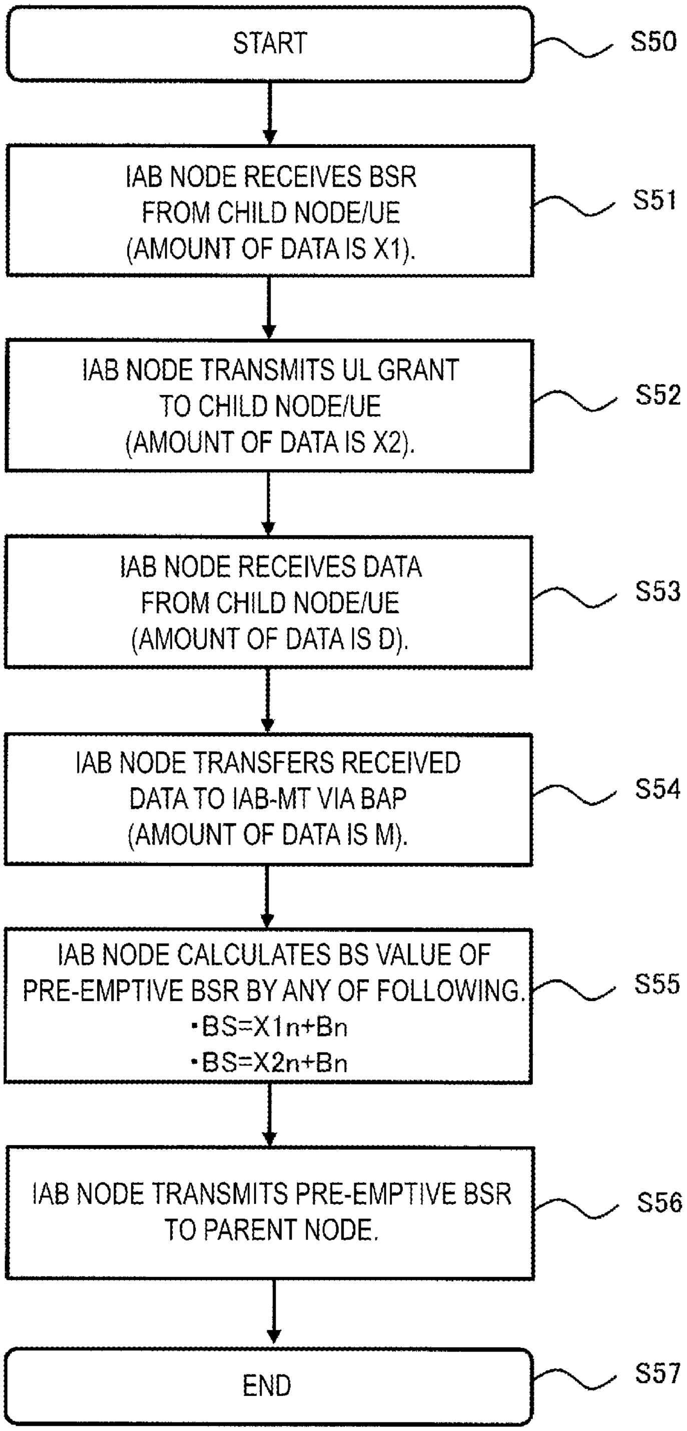

FIG. 17 is a flowchart illustrating an operation example according to Variation 1 of the second embodiment.

Figure 18A:
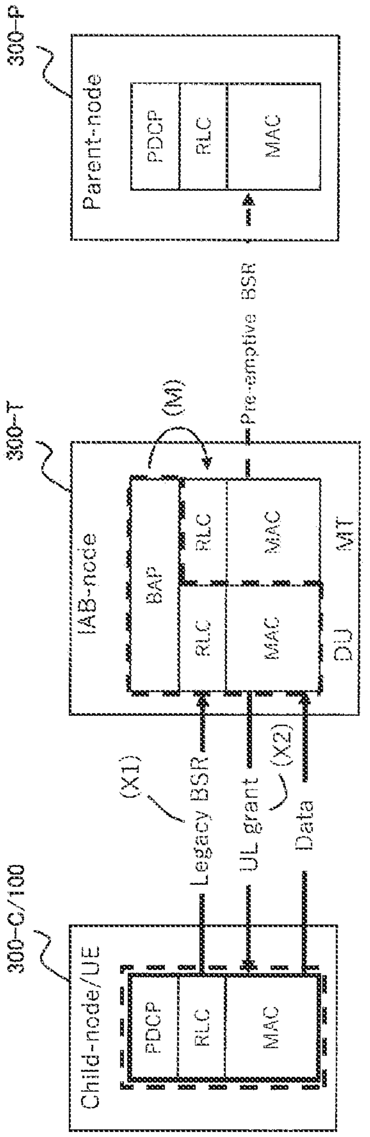
Figure 18B:
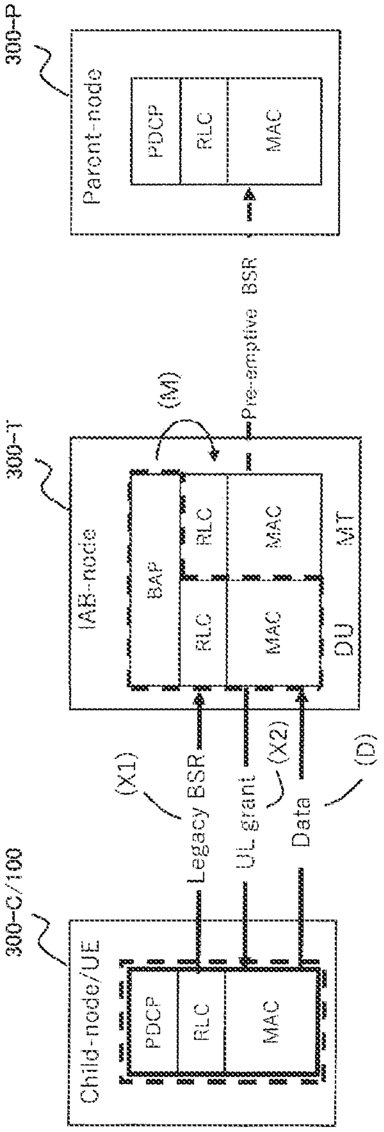

FIG. 18A and FIG. 18B are diagrams each illustrating an example of a target BS according to the second embodiment.

Figure 19:
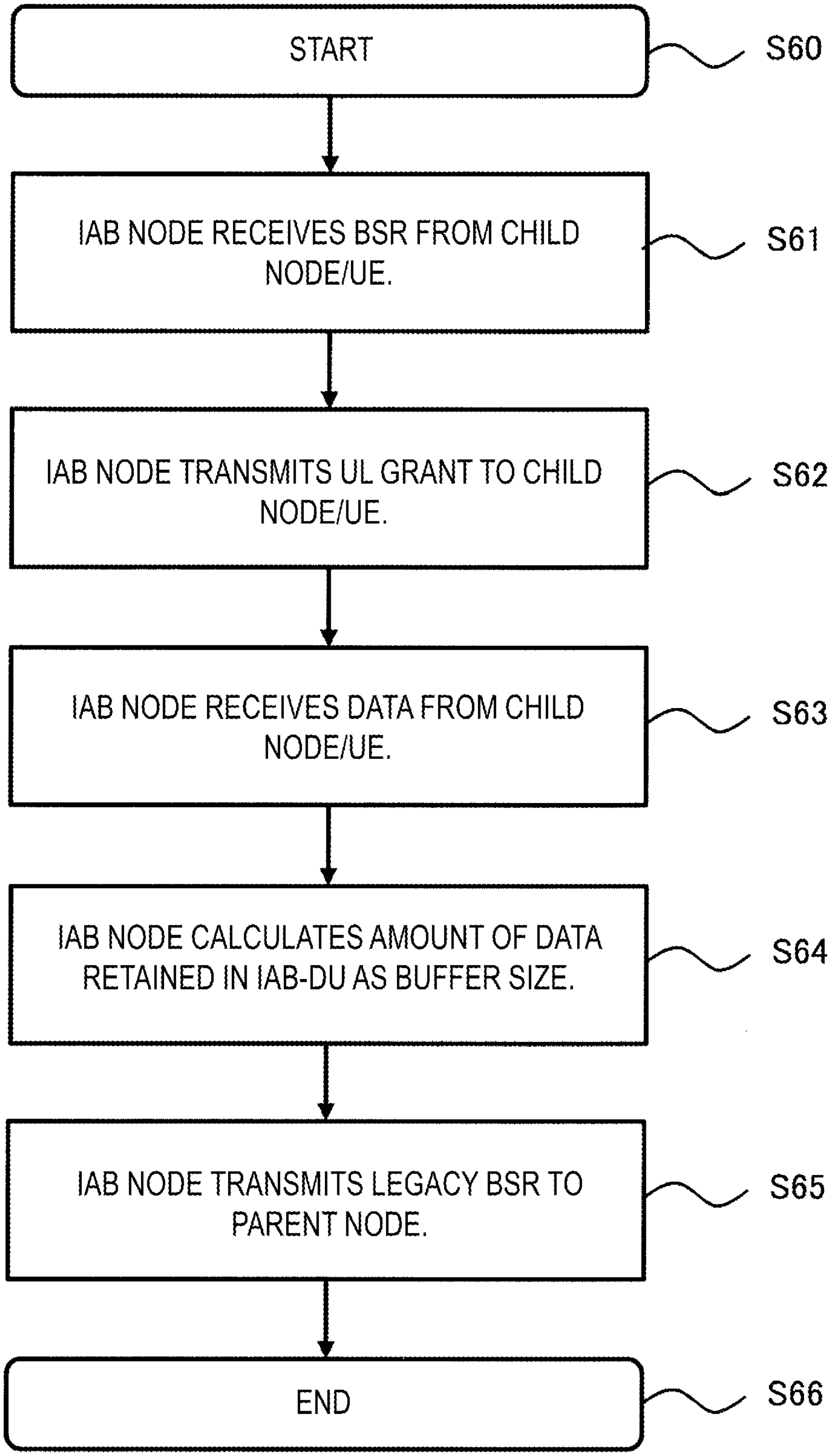

FIG. 19 is a flowchart illustrating an operation example according to Variation 2 of the second embodiment.

Figure 20:
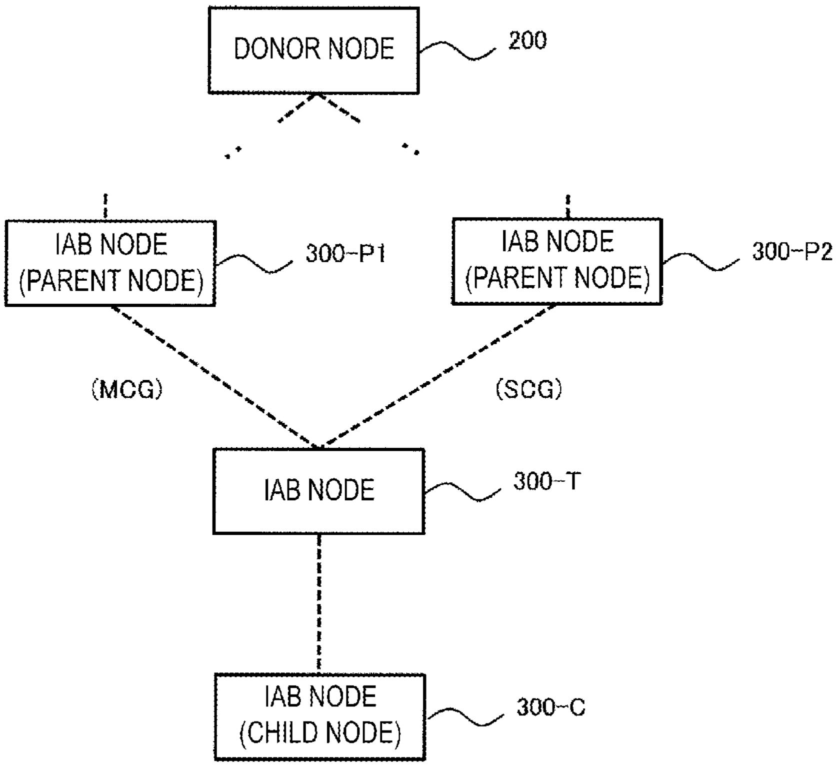

FIG. 20 is a diagram illustrating a configuration example of a cellular communication system 1 according to a third embodiment.

Figure 21:
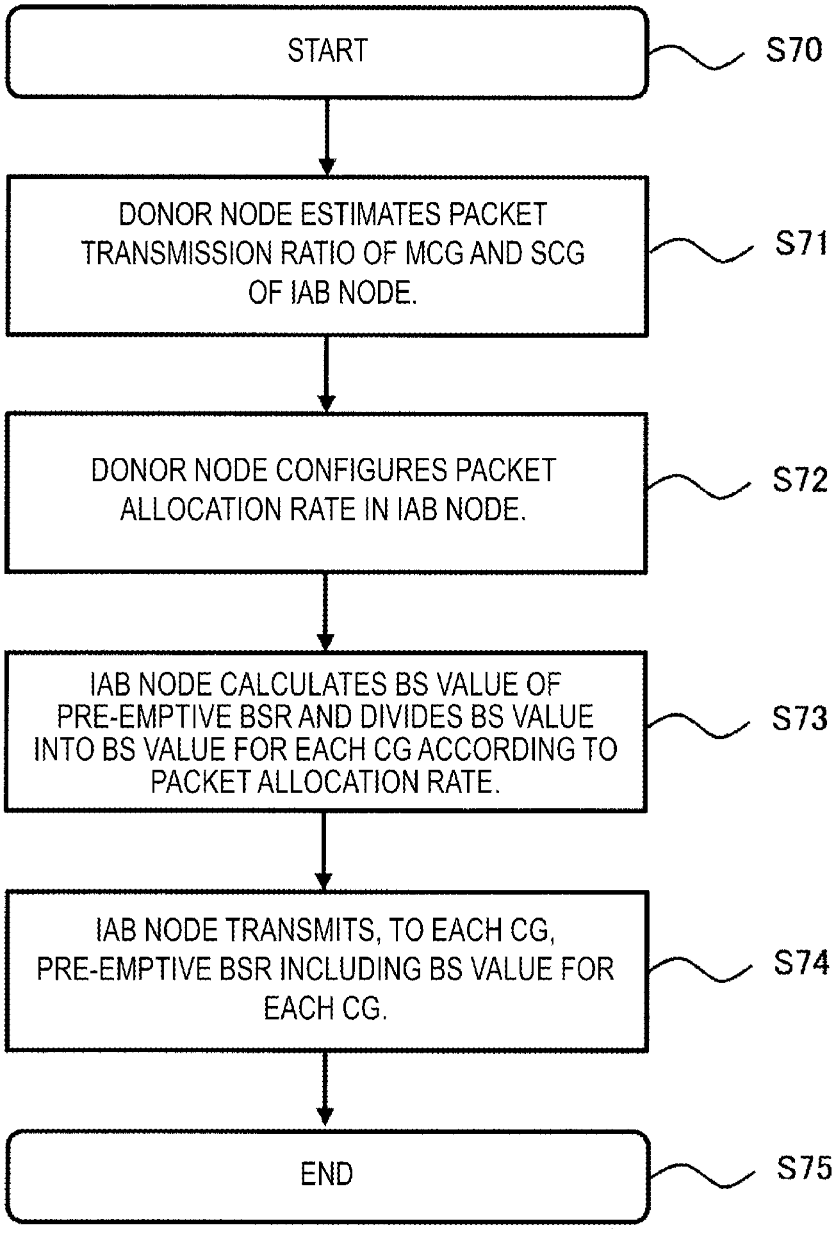

FIG. 21 is a flowchart illustrating an operation example according to the third embodiment.

Figure 22:
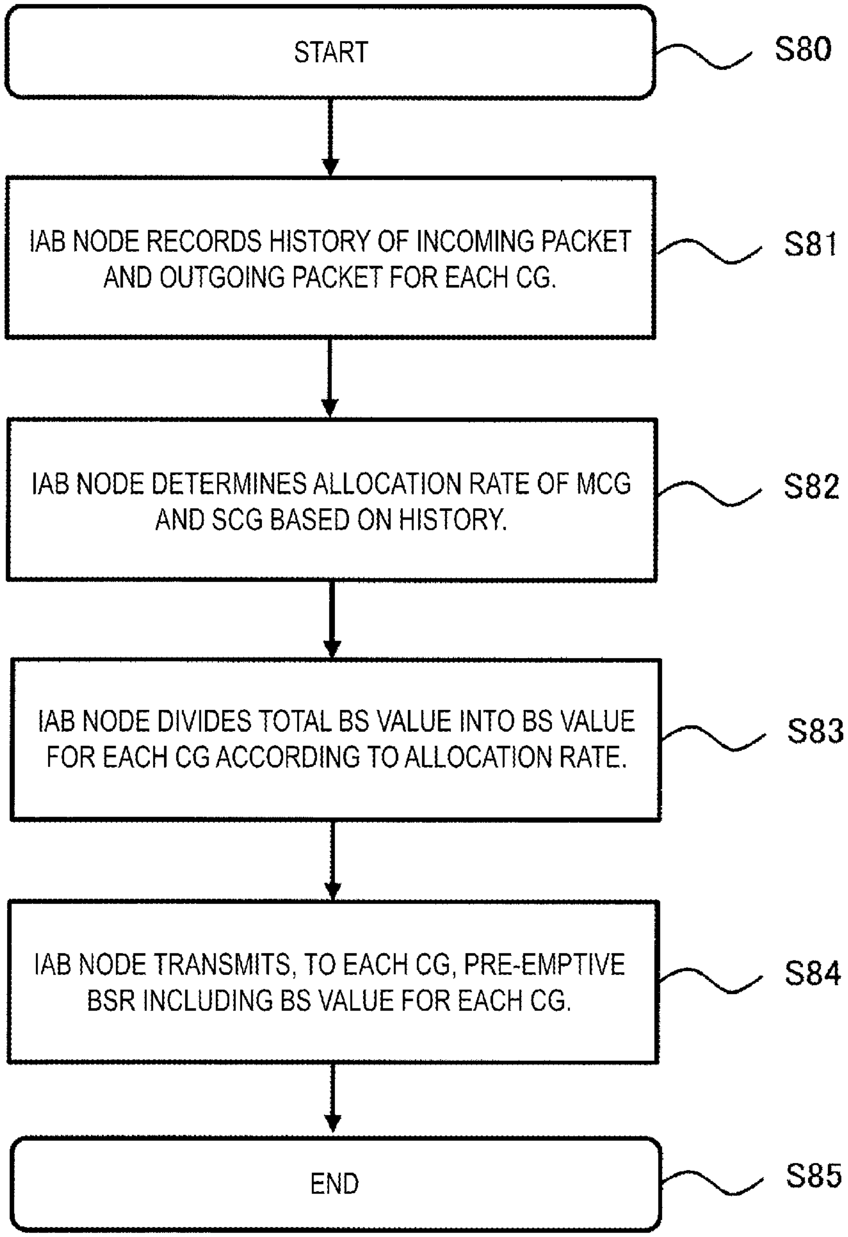

FIG. 22 is a flowchart illustrating an operation example according to Variation 2 of the third embodiment.

DESCRIPTION OF EMBODIMENTS

A cellular communication system in an embodiment is described with reference to the drawings. In the description of the drawings, the same or similar parts are denoted by the same or similar reference signs.

Configuration of Cellular Communication System First, a configuration example of the cellular communication system in an embodiment is described. A cellular communication system according to an embodiment is a 3GPP 5G system. Specifically, a radio access scheme in the cellular communication system 1 is New Radio (NR) being a 5G radio access scheme. Note that Long Term Evolution (LTE) may be at least partially applied to the cellular communication system. A future cellular communication system such as the 6G may be applied to the cellular communication system 1.

Figure 1:
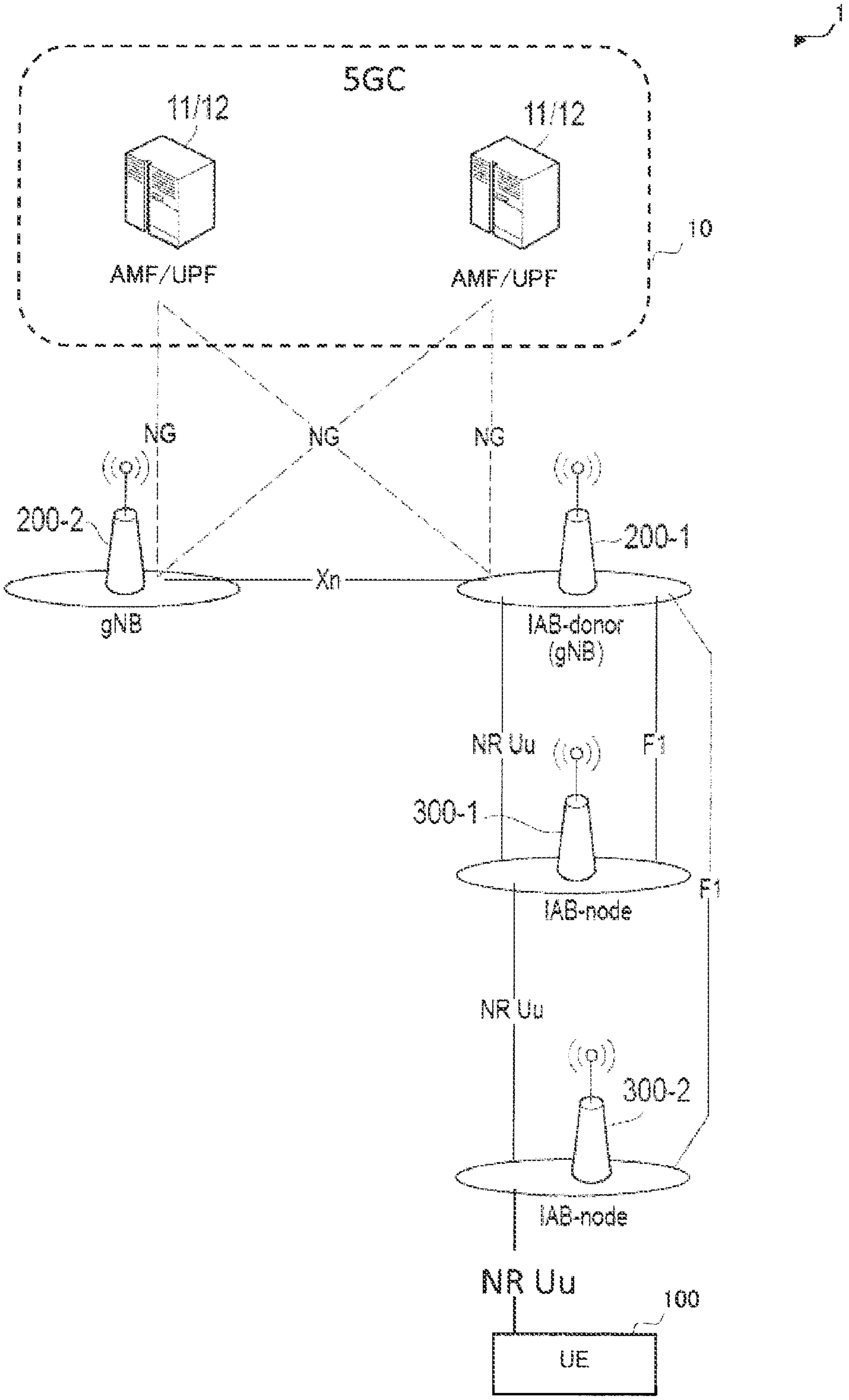
FIG. 1 is a diagram illustrating a configuration example of a cellular communication system according to an embodiment.

FIG. 1 is a diagram illustrating a configuration example of the cellular communication system 1 according to an embodiment.

As illustrated in FIG. 1, the cellular communication system 1 includes a 5G core network (5GC) 10, a User Equipment (UE) 100, base station apparatuses (hereinafter, also referred to as "base stations" in some cases) 200-1 and 200-2, and IAB nodes 300-1 and 300-2. The base station 200 may be referred to as a gNB.

An example in which the base station 200 is an NR base station is mainly described below, but the base station 200 may also be an LTE base station (i.e., an eNB).

Note that hereinafter the base stations 200-1 and 200-2 may be referred to as a gNB 200 (or the base station 200 in some cases). The IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. Hereinafter, a "cell" may be used without being distinguished from a base station such as the gNB 200. One cell belongs to one carrier frequency.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU and includes an F1-C protocol that is a control plane protocol and an F1-U protocol that is a user plane protocol.

The cellular communication system 1 supports an IAB that uses NR for the backhaul to enable wireless relay of the NR access. The donor gNB (or a donor node, which hereinafter may be also referred to as a "donor node") 200-1 is a donor base station that is a terminal node of the NR backhaul on the network side and includes additional functionality for supporting the IAB. The backhaul can implement multi-hop via a plurality of hops (i.e., a plurality of IAB nodes 300).

FIG. 1 illustrates an example in which the IAB node 300-1 is wirelessly connected to the donor node 200-1, the IAB node 300-2 is wirelessly connected to the IAB node 300-1, and the F1 protocol is transmitted in two backhaul hops.

The UE 100 is a mobile wireless communication apparatus that performs wireless communication with the cells. The UE 100 may be any type of apparatus as long as the UE 100 is an apparatus that performs wireless communication with the gNB 200 or the IAB node 300. Examples of the UE 100 include a mobile phone terminal and/or a tablet terminal, a laptop PC, a sensor or an apparatus that is provided in a sensor, a vehicle or an apparatus that is provided in a vehicle, and an aircraft or an apparatus provided in an aircraft. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor node 200-1 via the IAB node 300-2 and the IAB node 300-1.

Figure 2:
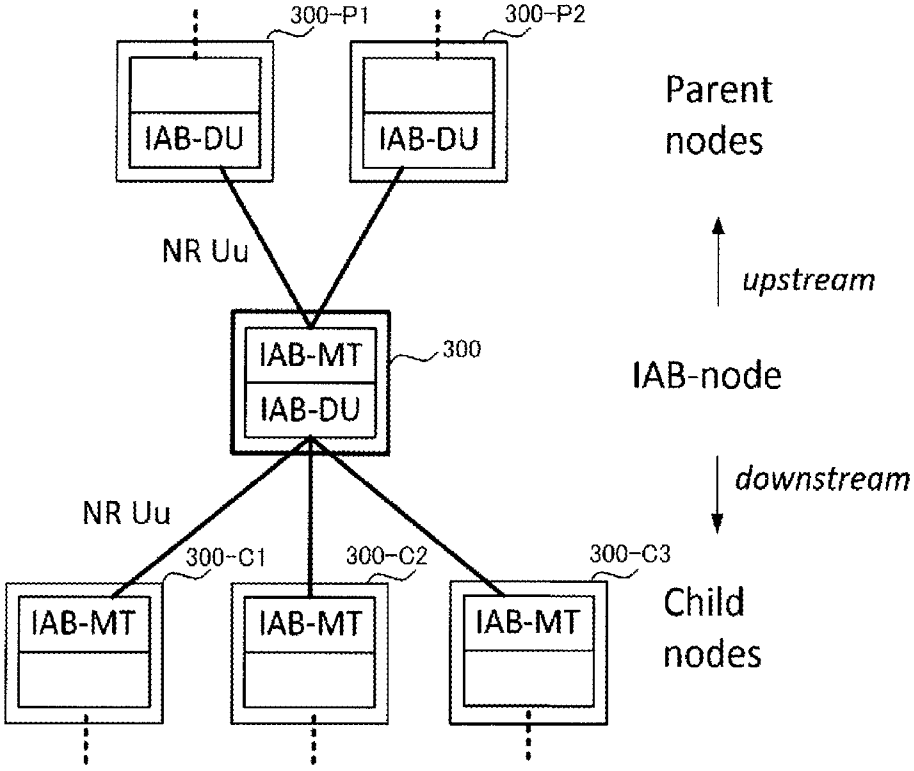
FIG. 2 is a diagram illustrating a relationship between an IAB node, Parent nodes, and Child nodes.

FIG. 2 is a diagram illustrating a relationship between the IAB node 300, parent nodes, and child nodes.

As illustrated in FIG. 2, each IAB node 300 includes an IAB-DU corresponding to a base station functional unit and an IAB-Mobile Termination (MT) corresponding to a user equipment functional unit.

Neighboring nodes of the IAB-MT (i.e., upper node) of an NR Uu wireless interface are referred to as "parent nodes". The parent node is the DU of a parent IAB node or the donor node 200. A radio link between the IAB-MT and each parent node is referred to as a backhaul link (BH link). FIG. 2 illustrates an example in which the parent nodes of the IAB node 300 are IAB nodes 300-P1 and 300-P2. Note that the direction toward the parent nodes is referred to as upstream. As viewed from the UE 100, the upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor node 200-1. FIG. 2 illustrates an example in which the child nodes of the IAB node 300 are IAB nodes 300-C1 to 300-C3; however, the UE 100 may be included in the child nodes of the IAB node 300. Note that the direction toward the child nodes is referred to as downstream.

All of the IAB nodes 300 connected to the donor node 200 via one or more hops form a Directed Acyclic Graph (DAG) topology (which may be referred to as "topology" below) rooted at the donor node 200. In this topology, the neighboring nodes of the IAB-DU in the interface are child nodes, and the neighboring nodes of the IAB-MT in the interface are parent nodes as illustrated in FIG. 2. The donor node 200 performs, for example, centralized management on resources, topology, and routes of the IAB topology. The donor node 200 is a gNB that provides network access to the UE 100 via a network of backhaul links and access links.

Configuration of Base Station

Figure 3:
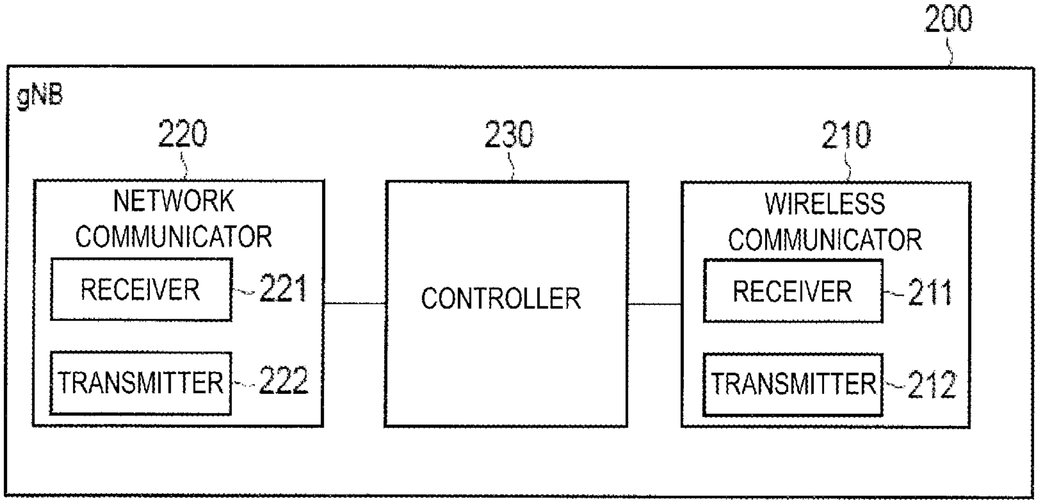
FIG. 3 is a diagram illustrating a configuration example of a gNB (base station) according to an embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna and converts (down-converts) a radio signal received by the antenna into a baseband signal (reception signal) which is then output to the controller 230. The transmitter 212 performs various types of transmission under control of the controller 230. The transmitter 212 includes an antenna and converts (up-converts) the baseband signal (transmission signal) output by the controller 230 into a radio signal which is then transmitted from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from an external source and outputs the reception signal to the controller 230. The transmitter 222 performs various types of transmission under control of the controller 230. The transmitter 222 transmits the transmission signal output by the controller 230 to an external destination.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below. In each embodiment described below, the controller 230 may perform various types of processing in the gNB 200 (or the donor node 200).

Configuration of Relay Node

Figure 4:
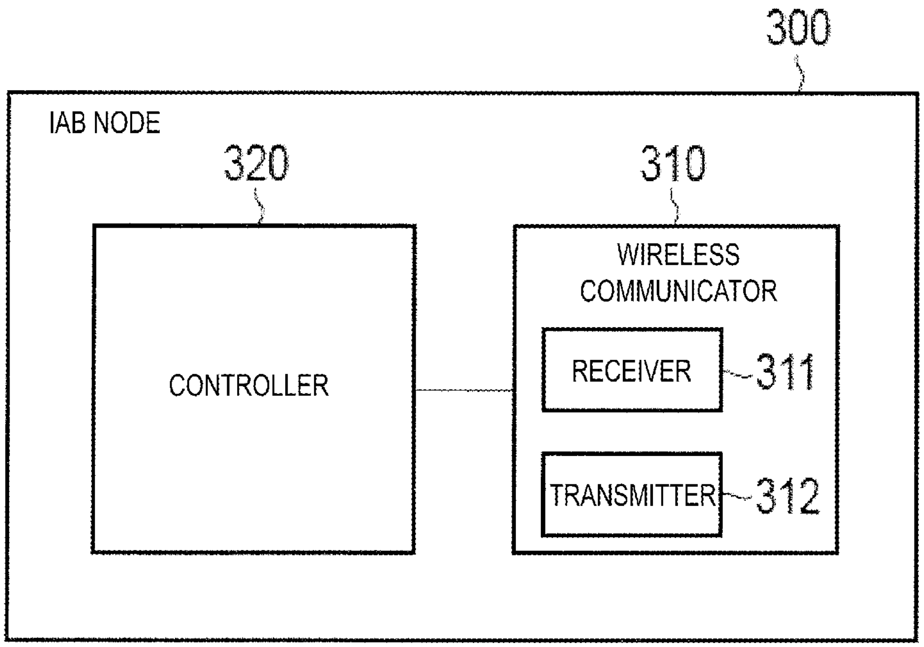
FIG. 4 is a diagram illustrating a configuration example of an IAB node (relay node) according to an embodiment.

A configuration of the IAB node 300 that is a relay node (or a relay node apparatus, which may be also referred to as a "relay node" below) according to the embodiment will be described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link). The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna and converts (down-converts) a radio signal received by the antenna into a baseband signal (reception signal) which is then output to the controller 320. The transmitter 312 performs various types of transmission under control of the controller 320. The transmitter 312 includes an antenna and converts (up-converts) the baseband signal (transmission signal) output by the controller 320 into a radio signal which is then transmitted from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 320 may perform various types of processing in the IAB node 300 in each embodiment described below.

Configuration of User Equipment

Figure 5:
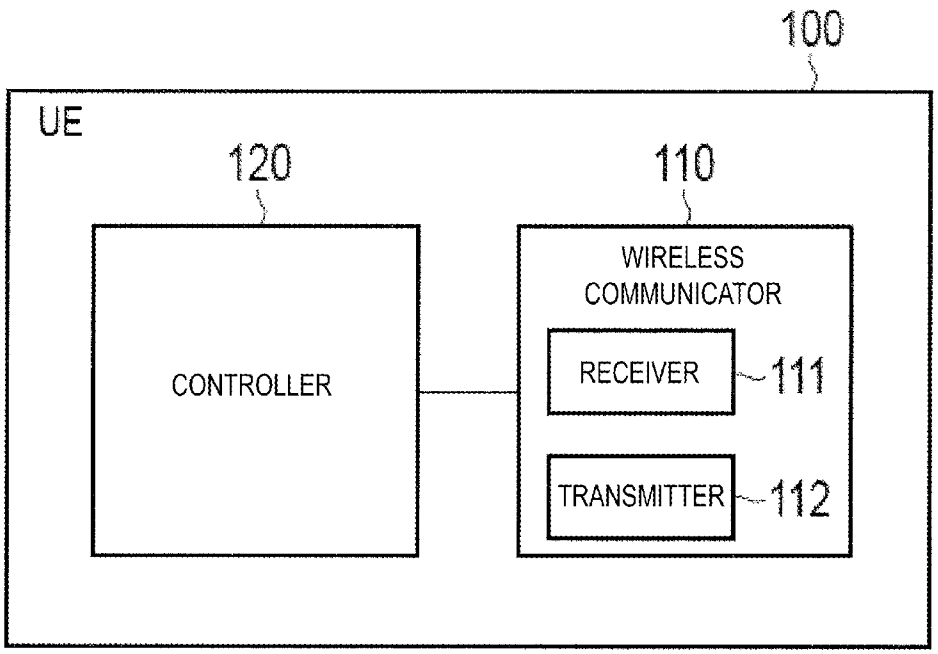
FIG. 5 is a diagram illustrating a configuration example of a UE (user equipment) according to an embodiment.

A configuration of the UE 100 that is a user equipment according to the embodiment is described next. FIG. 5 is a diagram illustrating a configuration example of the UE 100. As illustrated in FIG. 5, the UE 100 includes a wireless communicator 110 and a controller 120.

The wireless communicator 110 performs wireless communication in the access link, i.e., wireless communication with the gNB 200 and wireless communication with the IAB node 300. The wireless communicator 110 may also perform wireless communication in a sidelink, i.e., wireless communication with another UE 100. The wireless communicator 110 includes a receiver 111 and a transmitter 112. The receiver 111 performs various types of reception under control of the controller 120. The receiver 111 includes an antenna and converts (down-converts) a radio signal received by the antenna into a baseband signal (reception signal) which is then transmitted to the controller 120. The transmitter 112 performs various types of transmission under control of the controller 120. The transmitter 112 includes an antenna and converts (up-converts) the baseband signal (transmission signal) output by the controller 120 into a radio signal which is then transmitted from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 120 may perform each processing operation in the UE 100 in each embodiment described below.

Configuration of Protocol Stack

Figure 6:
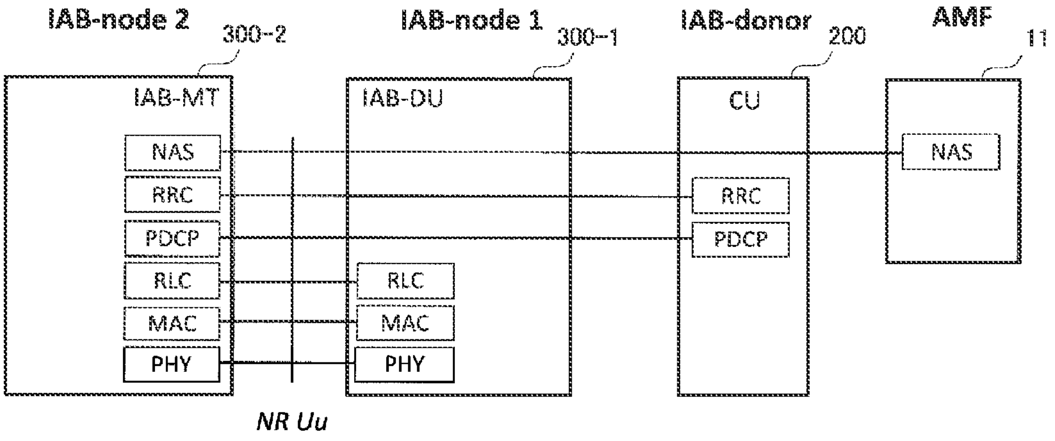
FIG. 6 is a diagram illustrating an example of a protocol stack related to an RRC connection and a NAS connection of an IAB-MT.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, Modulation and Coding Schemes (MCSs)) in the uplink and the downlink and resource blocks to be allocated.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the CU of the donor node 200 via a radio bearer.

The RRC layer controls a logical channel, a transport channel, and a physical channel according to establishment, re-establishment, and release of a radio bearer. RRC signaling for various configurations is transmitted between the RRC layer of the IAB-MT of the IAB node 300-2 and the RRC layer of the CU of the donor node 200. When an RRC connection to the donor node 200 is present, the IAB-MT is in an RRC connected state. When no RRC connection to the donor node 200 is present, the IAB-MT is in an RRC idle state.

The NAS layer which is positioned upper than the RRC layer performs session management, mobility management, and the like. NAS signaling is transmitted between the NAS layer of the IAB-MT of the IAB node 300-2 and the NAS layer of the AMF 11.

Figure 7:
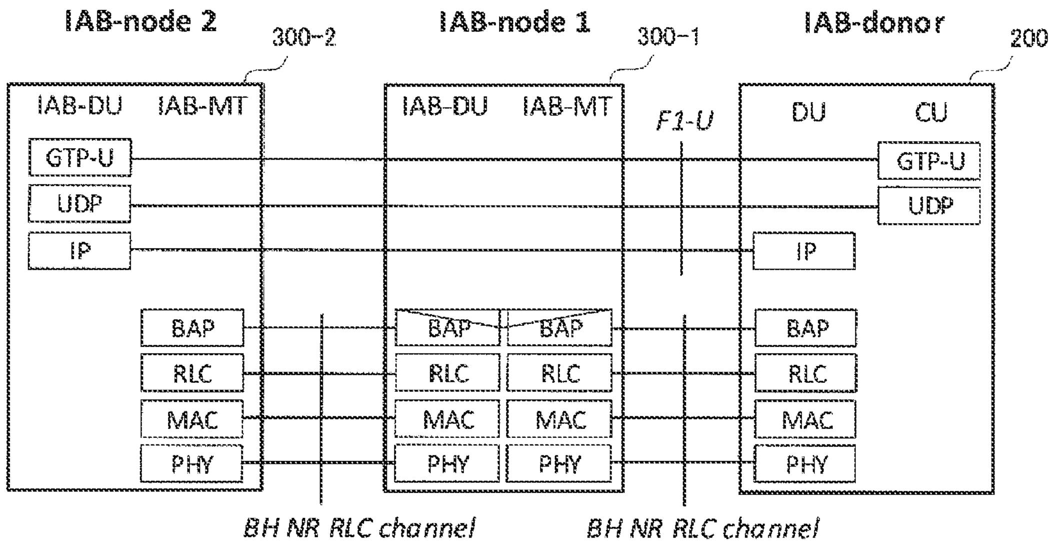
FIG. 7 is a diagram illustrating an example of a protocol stack related to an F1-U protocol.
Figure 8:
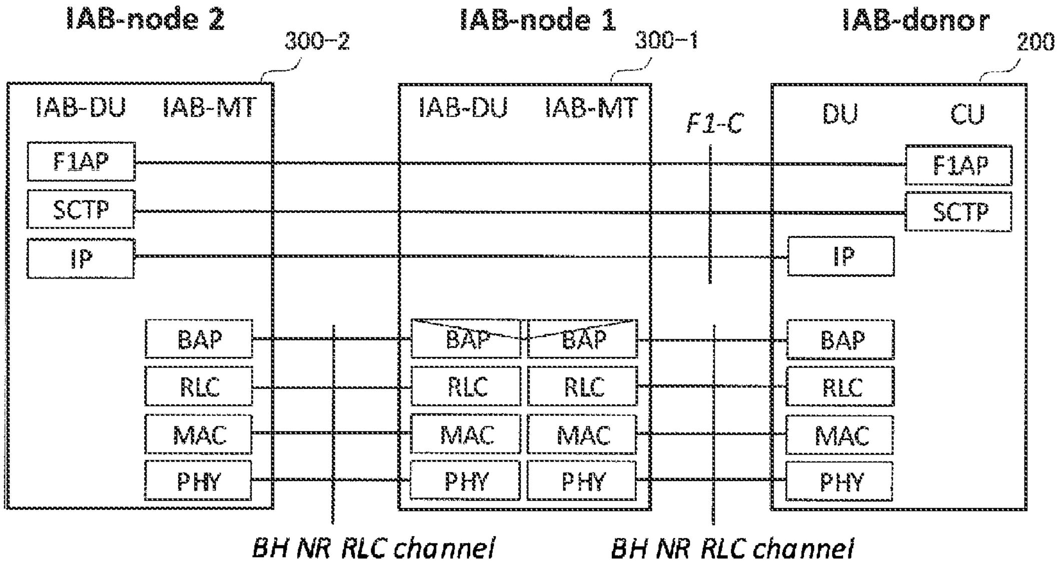
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. An example is illustrated in which the donor node 200 is divided into a CU and a DU.

As illustrated in FIG. 7, each of the IAB-MT of the IAB node 300-2, the IAB-DU of the IAB node 300-1, the IAB-MT of the IAB node 300-1, and the DU of the donor node 200 includes a Backhaul Adaptation Protocol (BAP) layer as a higher layer of the RLC layer. The BAP layer performs routing processing, and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Configuring multiple backhaul RLC channels in each BH link enables the prioritization and Quality of Service (QoS) control of traffic. The association between the BAP PDU and the backhaul RLC channel is executed by the BAP layer of each IAB node 300 and the BAP layer of the donor node 200.

Note that the CU of the donor node 200 is a gNB-CU function of the donor node 200 that terminates the F1 interface to the IAB node 300 and the DU of the donor node 200. The DU of the donor node 200 is a gNB-DU function of the donor node 200 that hosts an IAB BAP sublayer and provides a wireless backhaul to the IAB node 300.

As illustrated in FIG. 8, the protocol stack of the F1-C protocol includes an F1AP layer and an SCTP layer instead of a GTP-U layer and a UDP layer illustrated in FIG. 7.

Note that in the description below, processing or operation performed by the IAB-DU and the IAB-MT of the IAB may be simply described as processing or operation of the "IAB". For example, in the description, transmitting, by the IAB-DU of the IAB node 300-1, a message of the BAP layer to the IAB-MT of the IAB node 300-2 is assumed to correspond to transmitting, by the IAB node 300-1, the message to the IAB node 300-2. Processing or operation of the DU or CU of the donor node 200 may be described simply as processing or operation of the "donor node".

An upstream direction and an uplink (UL) direction may be used without distinction. A downstream direction and a downlink (DL) direction may be used without distinction.

First Embodiment

A first embodiment will be described.

Pre-Emptive Buffer Status Report (BSR)

Generally, a BSR transmitted by the UE 100 (hereinafter referred to as a "legacy BSR" as appropriate) indicates, for each logical channel group (LCG), the amount of uplink data untransmitted by each of the MAC, RLC, and PDCP layers (that is, an uplink buffer amount). Each LCG is a group including at least one logical channel and configured by priority. Based on the legacy BSR received from the UE 100, the gNB 200 determines, for each LCG, the amount of uplink data untransmitted by the UE 100 and performs scheduling such that the UE 100 is allocated uplink radio resources commensurate with the amount of uplink data untransmitted.

A portion A of FIG. 9 is a diagram illustrating a transmission example of a legacy BSR according to the first embodiment. Although "Regular BSR" is written in the portion A of FIG. 9, the "Regular BSR" may also be referred to as a legacy BSR hereinafter.

As illustrated in the portion A of FIG. 9, the IAB-MT of the IAB node 300-T reports, as a buffer size, the data amount waiting to be transmitted (or the amount of buffered data), which is present in the MAC and the RLC of the IAB-MT of the IAB node 300-T, by using a legacy BSR. The IAB-DU of the parent node 300-P allocates uplink radio resources commensurate with the data amount to the IAB node 300-T. The IAB-MT of the IAB node 300-T transmits the data to the parent node 300-P by using the allocated uplink radio resources.

Portions B and C of FIG. 9 are diagrams each illustrating a transmission example of a pre-emptive BSR according to the first embodiment.

As illustrated in the portion B of FIG. 9, after the IAB-DU of the IAB node 300-T transmits an uplink grant (UL grant) to the child node 300-C and before the IAB-DU of the IAB node 300-T receives UL data from the child node 300-C, the IAB-MT of the IAB node 300-T transmits a pre-emptive BSR to the parent node 300-P. As illustrated in the portion C of FIG. 9, after the IAB-DU of the IAB node 300-T receives a legacy BSR from the child node 300-C and before the IAB-DU of the IAB node 300-T transmits a UL grant to the child node 300-C, the IAB-MT of the IAB node 300-T transmits a pre-emptive BSR to the parent node 300-P.

In this way, the pre-emptive BSR is transmitted to the parent node 300-P at an earlier timing than the legacy BSR.

Accordingly, compared with the legacy BSR, the pre-emptive BSR enables a reduction in a delay (latency) of UL scheduling of the parent node 300-P for the IAB node 300-T.

FIG. 10 illustrates a configuration example of a MAC Control Element (CE) of the pre-emptive BSR (hereinafter referred to as a "pre-emptive BSR MAC CE" in some cases) according to the first embodiment.

The pre-emptive BSR MAC CE includes an "$LCG_i$" field and a "buffer size field" as illustrated in FIG. 10.

The "$LCG_i$" field is a field indicating that a buffer size of a logical channel group i exists. In other words, $LCG_i$ configured with "1" indicates that the buffer size of the logical channel group i will be reported. On the other hand, $LCG_i$ configured with "0" indicates that the buffer size of the logical channel group i will not be reported. The "LCG 1" field has a field length of 8 bits.

A predetermined buffer size is stored in the "buffer size" field. The predetermined buffer size is the total amount of data expected to arrive at the IAB-MT of the IAB node 300 in which the pre-emptive BSR has been triggered (the IAB node 300-T in FIG. 9), and does not include the total amount of data currently available at the IAB-MT.

Note that the BSR MAC CE illustrated in FIG. 10 also represents configuration examples of a long BSR MAC CE and a long truncated BSR MAC CE. The long BSR MAC CE is, for example, a MAC CE used when buffer sizes related to a plurality of LCGs are reported. The long truncated BSR MAC CE is, for example, a MAC CE that is used when the MAC layer reports a padding bit (or padding data) inserted when configuring a MAC PDU and that is used when the padding bit is larger than a predetermined size. When the BSR MAC CE is the long BSR MAC CE or the long truncated BSR MAC CE, the data amount available to all logical channels after the MAC PDU is constructed, i.e., the data amount waiting to be transmitted in the RLC and the MAC of the IAB-MT, is stored in the "buffer size" field.

Hereinafter, the pre-emptive BSR and the legacy BSR may be referred to as a "BSR" when not distinguished from each other.

The first embodiment is an example in which the upper node configures, in the IAB node 300, a predetermined calculation method among a plurality of calculation methods for the buffer size included in the pre-emptive BSR. Specifically, a first relay node (e.g., the IAB node 300-T) first calculates the buffer size (BS) using a first calculation method among the plurality of calculation methods related to the buffer size. Secondly, the first relay node transmits a pre-emptive Buffer Status Report (BSR) including the buffer size to a parent node (e.g., the parent node 300-P) of the first relay node. An upper node (e.g., the parent node 300-P or the donor node 200) of the first relay node configures the first calculation method in the first relay node.

Configuration Example of First Embodiment

First, a configuration example of the cellular communication system 1 according to the first embodiment will be described.

FIG. 11 is a diagram illustrating a configuration example of the cellular communication system 1 according to the first embodiment. As illustrated in FIG. 11, the donor node 200 includes subordinate IAB nodes 300-P, 300-T, and 300-C. A topology (or network) constructed by the donor node 200 may include another IAB node.

A parent node of the IAB node 300-T is the IAB node 300-P. A child node of the IAB node 300-T is the IAB node 300-C. Hereinafter, the IAB node 300-P may be referred to as the parent node 300-P. The IAB node 300-C may be referred to as the child node 300-C.

The upper node of the IAB node 300-T may be the parent node 300-P. The upper node of the IAB node 300-T may be the donor node 200. Note that the parent node 300-P may be the donor node 200.

FIG. 11 illustrates an example in which the IAB node 300-T is connected to one parent node 300-P, but the IAB node 300-T may be connected to a plurality of parent nodes 300-P1, 300-P2, . . . . In this case, for example, the IAB node 300-T is connected to the parent node 300-P1 and the parent node 300-P2 through dual connectivity. A master cell group (MCG) in dual connectivity is configured in the parent node 300-P1, and a secondary cell group (SCG) is configured in the parent node 300-P2, so that the IAB node 300-T is connected to the two parent nodes 300-P1 and 300-P2.

FIG. 11 illustrates an example in which the child node 300-C is connected to the IAB node 300-T. Instead of the child node 300-C, the UE 100 may be connected to the IAB node 300-T. Both the child node 300-C and the UE 100 may be connected to the IAB node 300-T.

Note that, in the following description, the child node 300-C includes the UE 100. Accordingly, in the following embodiment, both the child node 300-C and the UE 100 may be connected to the IAB node 300-T. Either the child node 300-C or the UE 100 may be connected to the IAB node 300-T.

Calculation Method of Buffer Size

The calculation method of the buffer size (BS) according to the first embodiment will be described.

As described above, the BS reported by the pre-emptive BSR "is the total amount of data expected to arrive at the IAB-MT of the IAB node 300 in which the pre-emptive BSR has been triggered (IAB node 300-T in FIG. 11), and does not include the total amount of data currently available at the IAB-MT". The specific calculation method depends on the implementation.

For example, some IAB nodes 300 may report a buffer size value more than an actually needed data amount to the parent node 300-P using a pre-emptive BSR to reduce UL data delay and increase UL transmission efficiency. However, in this case, some IAB nodes 300 are allocated resources more than others, and thus fair resource allocation cannot be guaranteed in the entire topology constructed by the donor node 200.

Thus, in the first embodiment, the upper node configures, in the IAB nodes 300, the calculation method used for calculating the BS. Thereby, each IAB node 300 can calculate the BS of the pre-emptive BSR by a common calculation method. Thus, fair resource allocation can be achieved in the entire topology. Since each IAB node 300 calculates the BS by the common calculation method, interoperability between the IAB nodes 300 including the donor node 200 can be improved.

A specific calculation method of the BS of the pre-emptive BSR will be described. Examples of the calculation method include the following.

BS=[the BS value of the current pre-emptive BSR]−[the BS value of the reported pre-emptive BSR] (Calculation method #1):

BS=[UL grant amount] (Calculation method #2):

BS=[the latest BSR received from the child node/UE]−[the data amount already received from the child node/UE after the reception of the BSR] (Calculation method #3):

The calculation method #1 is a calculation method of subtracting the BS value stored in the reported pre-emptive BSR from the BS value stored in the current pre-emptive BSR. That is, this is a calculation method in which a value obtained by subtracting the data amount reported in the previous pre-emptive BSR from the data amount in the current pre-emptive BSR is used as the BS value. In the calculation method #1, since the reported BS value is subtracted, the IAB node 300-T can be prevented from reporting a duplicate buffer size (data amount) as the pre-emptive BSR to the parent node 300-P.

The calculation method #2 is a calculation method in which the IAB node 300-T reports the pre-emptive BSR to the parent node 300-P with the resource amount (or the UL grant amount) allocated to the child node 300-C as the BS value. That is, the IAB node 300-T determines the expected data amount (buffer size) of the pre-emptive BSR based on the total amount of the UL grant provided to the child node 300-C. In the calculation method #2, since the resource allocation amount by the UL grant is used as the BS value of the pre-emptive BSR, the parent node 300-P can avoid wasting radio resources for the IAB node 300-T as much as possible.

The calculation method #3 is a calculation method in which a value obtained by subtracting, from the total amount of the legacy BSR received by the IAB node 300-T from the child node 300-C, the data amount already received from the child node 300-C after the reception of the legacy BSR is used as the BS value of the pre-emptive BSR. In the calculation method #3, the BS value can be calculated regardless of the trigger timing of the pre-emptive BSR (the portions B and C of FIG. 9).

The above-described three calculation methods are mere examples. Thus, the calculation method according to the first embodiment may include a calculation method other than the three calculation methods.

Operation Example of First Embodiment

FIG. 12 is a flowchart illustrating an operation example according to the first embodiment. The operation example will be described with reference to the configuration example of the cellular communication system 1 illustrated in FIG. 11 as appropriate.

The upper node of the IAB node 300-T (the parent node 300-P or the donor node 200) starts processing in step S10 as illustrated in FIG. 12.

In step S11, the upper node determines one calculation method among the plurality of BS calculation methods. For example, the upper node determines any one of the calculation methods #1 to #3.

Note that, in step S11, before the upper node determines the calculation method, the IAB node 300-T may transmit, to the upper node, BS calculation methods supported by the IAB node 300-T. In this case, the IAB node 300-T may transmit its supporting BS calculation methods to the upper node as its capability information. The upper node determines a calculation method among the BS calculation methods supported by the IAB node 300-T.

In step S12, the upper node configures the determined BS calculation method in the IAB node 300-T.

When the upper node is the donor node 200, the CU of the donor node 200 may configure the BS calculation method by transmitting a F1AP message including the determined calculation method to the IAB-DU of the IAB node 300-T. When the upper node is the donor node 200, the CU of the donor node 200 may configure the BS calculation method by transmitting an RRC message including the determined calculation method to the IAB-MT of the IAB node 300-T. When the upper node is the parent node 300-P, the IAB-DU of the parent node 300-P may configure the calculation method by transmitting a BAP Control PDU, a MAC CE, or the like including the determined calculation method to the IAB-MT of the IAB node 300-T.

When dual connectivity is configured in the IAB node 300-T, the upper node may configure, in the IAB-MT of the IAB node 300-T, different calculation methods for respective cell groups (Master Cell Group (MCG) and Secondary Cell Group (SCG)). For example, the upper node configures, in the IAB-MT of the IAB node 300-T, the calculation method #1 for the MCG and the calculation method #2 for the SCG. In this case, the cell groups and the BS calculation methods are configured in association with each other.

In step S13, the IAB-MT of the IAB node 300-T calculates a BS value of a pre-emptive BSR by the configured calculation method.

Note that the IAB node 300-T may change the configured calculation method for some reason. In this case, the IAB node 300-T transmits a change request to the upper node, and, in accordance with the change request, the upper node configures, in the IAB node 300-T, a calculation method different from the calculation method having been configured in the IAB node 300-T in step S12. The calculation method may be configured by the same configuration method as that in step S12.

In step S14, the IAB-MT of the IAB node-T 300 transmits, to the parent node 300-P, the pre-emptive BSR including the calculated BS value.

In step S15, the IAB node 300-T ends a series of processing operations.

Variation 1 of First Embodiment

Variation 1 of the first embodiment will be described. Variation 1 of the first embodiment is an example in which the IAB node 300-T determines the calculation method of the BS of the pre-emptive BSR and transmits the determined calculation method to the upper node of the IAB node 300-T.

Specifically, the first relay node (e.g., the IAB node 300-T) determines a first calculation method and transmits the determined first calculation method to the upper node (e.g., the parent node 300-P or the donor node 200) of the first relay node.

As a result, for example, the BS calculation method is shared between the IAB nodes 300 including the donor node 200, and in a manner same as and/or similar to the first embodiment, fair resource allocation can be achieved and interoperability can be improved.

FIG. 13 is a flowchart illustrating an operation example according to Variation 1 of the first embodiment.

The IAB node 300-T starts processing in step S20 as illustrated in FIG. 13.

In step S21, the IAB-MT of the IAB node 300-T determines one calculation method among the plurality of BS calculation methods. The IAB-MT of the IAB node 300-T may determine the calculation method by selecting any one of the calculation methods #1 to #3. When dual connectivity is configured, the IAB node 300-T may determine a different calculation method for each cell group (CG: MCG and SCG). In this case, the CGs and the calculation methods are associated with each other.

In step S22, the IAB node 300-T transmits the determined calculation method to the upper node (e.g., the donor node 200 or the parent node 300-P). The IAB node 300-T may transmit the determined BS calculation method using, for example, a F1AP message, an RRC message, a BAP Control PDU, or a MAC CE. When dual connectivity is configured and different calculation methods are determined for CGs, the IB-MT of the IAB node 300-T may transmit the respective determined BS calculation methods to the parent node 300-P1 included in the MCG and the parent node 300-P2 included in the SCG. In this case, the IAB node 300-T may transmit all the determined BS calculation methods to the donor node 200. In any case, for example, the IAB node 300-T transmits the BS calculation method to the upper node using a F1AP message, an RRC message, a BAP Control PDU, or a MAC CE.

In step S23, the IAB-MT of the IAB node 300-T calculates a BS value of a pre-emptive BSR using the transmitted calculation method.

Note that, in a manner same as and/or similar to the first embodiment, the IAB-MT of the IAB node 300-T may change the calculation method transmitted in step S22 for some reason. In this case, the IAB-MT of the IAB node 300-T transmits the changed calculation method to the upper node and calculates the BS value by the changed calculation method.

In step S24, the IAB node 300-T transmits, to the parent node 300-P, the pre-emptive BSR including the calculated BS value.

In step S25, the IAB node 300-T ends a series of processing operations.

Variation 2 of First Embodiment

Variation 2 of the first embodiment will be described.

As described above, there are two types of transmission timing (hereinafter, referred to as "trigger" in some cases) of the pre-emptive BSR including timing after transmission of the UL grant to the child node 300-C (the portion B of FIG. 9) and timing after reception of the legacy BSR from the child node 300-C (the portion C of FIG. 9). The former timing may be referred to as a "UL grant trigger", and the latter timing may be referred to as a "legacy BSR trigger".

In the case of the "UL grant trigger", the IAB node 300-T transmits the pre-emptive BSR to the parent node 300-P after transmitting the UL grant to the child node 300-C and before receiving the data from the child node 300-C (the portion B of FIG. 9). On the other hand, the calculation method #3 is a calculation method of calculating the BS based on the latest BSR value received from the child node 300-C. When the calculation method #3 is performed in the case of the "UL grant trigger", the IAB node 300-T waits to transmit the pre-emptive BSR until after the UL grant, although the legacy BSR is received from the child node 300-C and the BS value can be calculated by the calculation method #3. Thus, in the case of the "UL grant trigger", it cannot be said that performing the calculation method #3 is necessarily optimal.

In the case of the "legacy BSR trigger", the IAB node 300-T transmits the pre-emptive BSR to the parent node 300-P after receiving the legacy BSR from the child node 300-C and before transmitting the UL grant to the child node 300-C (the portion C of FIG. 9). On the other hand, the calculation method #2 is a calculation method of calculating the BS value as the resource amount allocated to the child node 300-C using the UL grant. When the calculation method #2 is performed in the case of the "legacy BSR trigger", the IAB node 300-T transmits the pre-emptive BSR before transmitting the UL grant to the child node 300-C and calculating its allocation amount using the calculation method #2. Thus, in the case of the "legacy BSR trigger", it cannot be said that performing the calculation method #2 is necessarily optimal.

Thus, in Variation 2 of the first embodiment, the calculation method of the BS of the pre-emptive BSR is determined according to the trigger type of the pre-emptive BSR. Specifically, the first relay node (e.g., the IAB node 300-T) determines a first calculation method among the plurality of calculation methods of the BS of the pre-emptive BSR in accordance with the transmission timing of the pre-emptive BSR.

Accordingly, for example, the IAB node 300-T can calculate the BS value of the pre-emptive BSR using an optimum calculation method in accordance with the trigger type of the pre-emptive BSR.

FIG. 14 is a flowchart illustrating an operation example according to Variation 2 of the first embodiment.

As illustrated in FIG. 14, in step S31, the upper node (e.g., the parent node 300-P or the donor node 200) configures the trigger type of the pre-emptive BSR in the IAB node 300-T. Alternatively, the IAB node 300-T itself determines the trigger type. For example, the upper node may configure the trigger type in the IAB node 300-T using a F1AP message, an RRC message, a BAP Control PDU, a MAC CE, or the like. When the IAB node 300-T itself configures the trigger type, the IAB node 300-T may transmit the configured trigger type to the upper node. The IAB node 300-T may transmit the configured trigger type to the upper node using a F1AP message or the like.

In step S32, the IAB-MT of the IAB node 300-T determines a calculation method of the BS value of the pre-emptive BSR based on the used trigger type configured or determined.

When the trigger type is the "UL grant trigger", the IAB-MT of the IAB node 300-T may determine that the calculation method using the UL grant is the calculation method of the BS value. Examples of such a calculation method include the above-described calculation method #2. When the trigger type is the "UL grant trigger", the IAB node 300-T transmits, to the child node 300-C, the pre-emptive BSR after transmitting the UL grant. Thus, the IAB-MT of the IAB node 300-T can calculate the BS value based on the resource amount allocated by the UL grant after transmitting the UL grant. The IAB node 300-T can transmit the pre-emptive BSR including the calculated BS value to the parent node 300-P.

When the trigger type is the "legacy BSR trigger", the IAB-MT of the IAB node 300-T may determine that the calculation method using the legacy BSR is the calculation method of the BS value. Examples of such a calculation method include the above-described calculation method #3. When the trigger type is the "legacy BSR trigger", the IAB-MT of the IAB node 300-T transmits the pre-emptive BSR after receiving the legacy BSR from the child node 300-C. Thus, the IAB-MT of the IAB node 300-T can calculate the BS value by the calculation method #3 based on the received BSR. The pre-emptive BSR including the calculated BS value may be transmitted to the parent node 300-P.

The determination of the calculation method as described above is a mere example, and the IAB node 300-T is only required to determine the calculation method of the BS in accordance with the trigger type.

In step S33, the IAB-MT of the IAB node 300-T calculates the BS value of the pre-emptive BSR using the determined BS calculation method.

In step S34, the IAB-MT of the IAB node 300-T transmits, to the parent node 300-P, the pre-emptive BSR including the calculated BS value.

In step S35, the IAB node 300-T ends a series of processing operations.

Second Embodiment

A second embodiment will be described. The second embodiment relates to a calculation method of a BS value of a pre-emptive BSR. However, in the second embodiment, an example in which connection of the IAB node 300-T is single connection will be described. Examples of the single connection include a case where the single parent node 300-P is connected to the IAB node 300-T in the configuration example of the cellular communication system 1 illustrated in FIG. 11. An example in which the plurality of parent nodes 300-P are connected to the IAB node 300-T will be described in a third embodiment.

Here, a target buffer size when the IAB node 300-T receives a legacy BSR from the child node 300-C and transmits a legacy BSR to the parent node 300-P (the portion A of FIG. 9) will be described.

FIG. 15A is a diagram illustrating an example of a target BS in the case of a legacy BSR according to the second embodiment. Here, an example in which the child node 300-C and/or the UE 100 is connected to the IAB node 300-T is illustrated. In the following description, the child node 300-C is connected to the IAB node 300-T unless otherwise specified.

As illustrated in FIG. 15A, (the IAB-MT of) the child node 300-C transmits a legacy BSR to the IAB node 300-T (step S400). The BS value included in the legacy BSR is the data amount that is present in the PDCP, the RLC, and the MAC of (the IAB-MT of) the child node 300-C and that waits to be transmitted.

The IAB-DU of the IAB node 300-T allocates a UL grant (step S401) and receives data from the child node 300-C.

Thereafter, the IAB-MT of the IAB node 300-T transmits a legacy BSR (step S402). The target BS value reported as the BS value of the legacy BSR is the data amount present in the RLC and the MAC of the IAB-MT of the IAB node 300-T.

FIG. 15B is a diagram illustrating an example of a target BS in the case of a pre-emptive BSR according to the second embodiment. In a manner same as and/or similar to FIG. 15A, FIG. 15B illustrates an example in which the IAB node 300-T receives a legacy BSR from the child node 300-C (step S410) and transmits a UL grant to the child node 300-C (step S411).

The IAB node 300-T transmits a pre-emptive BSR after step S410 or step S411. In this case, the target BS value reported as the BS value of the pre-emptive BSR is data present in a higher layer than the RLC of the IAB-MT of the IAB node 300-T, data present in the IAB-DU of the IAB node 300-T, and data present in the child node 300-C. The sum of these amounts of data is the total amount of data expected to arrive at the IAB-MT and does not include the total amount of data currently available at the IAB-MT.

While data actually arrives from the child node 300-C and is processed in the higher layer than the RLC of the IAB-MT, the IAB node 300-T reports the data amount as the BS value of the pre-emptive BSR. As a result, the IAB node 300-T can transmit the processed data to the parent node 300-P immediately after receiving a UL grant from the parent node 300-P and thus can eliminate the delay of UL data transmission.

That is, the ideal target BS value of the pre-emptive BSR is the data amount present in the higher layer than the RLC of the IAB-MT of the IAB node 300-T, data present in the IAB-DU of the IAB node 300-T, and data present in the child node 300-C. In FIG. 15B, the data amount present in the layers indicated by the dotted line can be the ideal target BS value.

The calculation method #2 described in the first embodiment is a calculation method in which the BS value of the pre-emptive BSR is a resource allocated by the UL grant (step S411). In the calculation method #2, in the IAB node 300-T, the data amount received before the transmission of the UL grant (step S411) is not included. That is, data present in the IAB-DU and data in the higher layer than the RLC of the IAB-MT before the UL grant transmission (step S411) is not reported as the BS value of the pre-emptive BSR. In the calculation method #2, it is not clear the UL grant transmitted until when is reported as the BS value. Thus, data transferred to the RLC or the MAC of the IAB-MT of the IAB node 300-T may be reported as the BS value of the pre-emptive BSR. Thus, in the calculation method #2, there is a case where all the data of the target BS indicated by the dotted line in FIG. 15B cannot be used as the BS value of the pre-emptive BSR.

The calculation method #3 described in the first embodiment is a calculation method in which a value obtained by subtracting the data amount already received from the child node 300-C from the BS value of the legacy BSR (step S410) is used as the BS value. Thus, the calculation method #3 enables the data transferred to the RLC or the MAC of the IAB-MT of the IAB node 300-T not to be included as the BS value. In the calculation method #3, since the BS value of the legacy BSR (step S410) is included, the data amount present in the child node 300-C at a certain point of time can be also included in the BS value. However, at this point of time, the data amount already received in the IAB-DU of the IAB node 300-T is not included as the BS value. In this case, for example, when the reception processing is delayed in the IAB-DU, data not transferred to the IAB-MT and retained in the IAB-DU may not be included in the BS value. Thus, in the calculation method #3, there is a case where all the data of the target BS indicated by the dotted line in FIG. 15B cannot be used as the BS value of the pre-emptive BSR.

Thus, in the second embodiment, the relay node (e.g., the IAB node 300-T) first receives a legacy BSR including a buffer size amount X1 from the child node (e.g., the child node 300-C) of the relay node. Secondly, the relay node transmits an uplink grant (UL grant) including a resource amount X2 to the child node. Thirdly, the relay node receives data from the child node. Fourthly, the relay node transfers the data to the IAB-MT of the relay node. Fifthly, the buffer size is calculated by either (X1−M) or (X2−M), where M is the data amount transferred by the relay node to the IAB-MT of the relay node. Fifthly, the relay node transmits a pre-emptive BSR including the calculated buffer size to the parent node of the relay node (e.g., the parent node 300-P).

FIG. 16 is a flowchart illustrating an operation example according to the second embodiment. The operation example will be described with reference to numerical values and the like illustrated in FIG. 18A as appropriate. Note that FIG. 18A is a diagram illustrating an example of a target BS.

The IAB node 300-T starts processing in step S40 as illustrated in FIG. 16.

In step S41, the IAB-DU of the IAB node 300-T receives a legacy BSR from the child node 300-C. As illustrated in FIG. 18A, it is assumed that the legacy BSR includes a BS value of a data amount X1.

Returning to FIG. 16, in step S42, the IAB-DU of the IAB node 300-T transmits a UL grant to the child node 300-C. As illustrated in FIG. 18A, the resource amount (or data amount) allocated in the UL grant is denoted as X2.

Returning to FIG. 16, in step S43, the IAB-DU of the IAB node 300-T receives data from the child node 300-C.

In step S44, the IAB-DU of the IAB node 300-T transfers the received data to the IAB-MT via the BAP. As illustrated in FIG. 18A, the data amount transferred by the IAB-DU of the IAB node 300-T to the IAB-MT via the BAP is denoted as M.

Note that the IAB node 300-T clears (zeros) X1, X2, and M under any of the following conditions. This is, for example, to avoid performing duplicate calculation.

- Condition 1: a case where a legacy BSR is newly received from the same child node 300-C as the child node 300-C that has transmitted the BSR received in step S41
- Condition 2: a case where a new UL grant is transmitted to the same child node 300-C as the transmission destination of the UL grant transmitted in step S42

In the IAB node 300-T, transferring data to the IAB-MT includes transferring data from the BAP of the IAB-MT to the RLC of the IAB-MT. In the IAB node 300-T, data retained in the IAB-DU includes the data retained in the IAB-DU and data retained in the BAP of the IAB-MT.

In step S45, the IAB node 300-T calculates the BS value of the pre-emptive BSR by any one of the following.

$$BS = X1 - M, \text{ or}$$

$$BS = X2 - M$$

However, in step S45, the IAB node 300-T may calculate the BS value of the pre-emptive BSR by any one of the following equations. Here, n is the number of the child nodes 300-C connected to the IAB node 300-T.

$$BS = X1n - Mn \text{ or}$$

$$BS = X2n - Mn$$

(Where X1n represents the total sum of X1 of n nodes, X2n represents the total sum of X2 of n nodes, and Mn represents the total sum of M of n nodes.)

In this way, the IAB node 300-T calculates, as the BS value of the pre-emptive BSR, a value obtained by subtracting the data amount transferred by the IAB-DU to the IAB-MT from the BS value included in the legacy BSR received from the child node 300-C.

The IAB node 300-T calculates, as the BS value of the pre-emptive BSR, a value obtained by subtracting the data amount transferred by the IAB-DU to the IAB-MT from the resource amount allocated to the child node 300-C by the UL grant.

In this way, in the second embodiment, a value obtained by subtracting the data amount transferred to the IAB-MT, that is, the data amount retained in the IAB-DU, is used for calculation of the BS value of the pre-emptive BSR. Thus, in the second embodiment, the ideal target BS indicated by the dotted line in FIG. 15B can be included in calculation of the BS value, and thus the BS value can be calculated with high accuracy.

In step S46, the IAB node 300-T transmits, to the parent node 300-P, the pre-emptive BSR including the calculated BS value.

In step S47, the IAB node 300-T ends a series of processing operations.

Variation 1 of Second Embodiment

Variation 1 of the second embodiment will be described. Compared with the BS calculation method according to the second embodiment, Variation 1 of the second embodiment is a calculation method of calculating the BS value of the pre-emptive BSR by further adding the data amount retained in the IAB-DU of the IAB node 300-T.

Specifically, when the buffer size is calculated and the data amount received by the relay node (e.g., the IAB node 300-T) from the child node (e.g., the child node 300-C) is denoted as D, the buffer size is calculated by either (X1+(D−M)) or (X2+(D−M)). Here, X1 represents the BS value included in the legacy BSR received by the IAB node 300-T from the child node 300-C. X2 represents the amount of allocated resources included in the UL grant transmitted by the IAB node 300-T to the child node 300-C. M represents the data amount transferred to the IAB-MT in the IAB node 300-T.

FIG. 17 is a flowchart illustrating an operation example according to Variation 1 of the second embodiment. The operation example will be described with reference to numerical values and the like illustrated in FIG. 18B as appropriate. Note that FIG. 18B is a diagram illustrating an example of a target BS.

The IAB node 300-T starts processing in step S50 as illustrated in FIG. 17.

Step S51 and step S52 are the same as step S41 and step S42 (FIG. 16) in the second embodiment, respectively.

In step S53, the IAB-DU of the IAB node 300-T receives data from the child node 300-C. As illustrated in FIG. 18B, the data amount received from the child node 300-C is denoted as D.

Returning to FIG. 17, in step S54, the IAB-DU of the IAB node 300-T transfers the received data to the IAB-MT via the BAP. As illustrated in FIG. 18B, the data amount transferred to the IAB-MT is denoted as M. M may be part or the whole of D.

Here, under any of the following conditions, the IAB-MT of the IAB node 300-T stores, in the memory, the amount B (=D−M) of data retained in the IAB-DU and clears (zeros) X1, X2, and M. This is, for example, to avoid performing duplicate calculation.

- Condition 3: a case where a legacy BSR is newly received from the same child node 300-C as the child node 300-C that has transmitted the legacy BSR received in step S51
- Condition 4: a case where a new UL grant is transmitted to the same child node 300-C as the transmission destination of the UL grant transmitted in step S52

In step S55, the IAB-MT of the IAB node 300-T calculates a BS value of a pre-emptive BSR by any one of the following.

$$BS = X1 + B, \text{ or}$$

$$BS = X2 + B$$

However, in step S55, the IAB node 300-T may calculate the BS value of the pre-emptive BSR by any one of the following equations. Here, n is the number of the child nodes 300-C connected to the IAB node 300-T.

$$BS = X1n + Bn, \text{ or}$$

$$BS = X2n + Bn$$

(Where Bn represents the total sum of B of n nodes.)

In this way, the IAB node 300-T calculates, as the BS value of the pre-emptive BSR, a value obtained by adding the amount B (=D−M) of data retained in the IAB-DU to the BS value (X1) included in the legacy BSR received from the child node 300-C.

The IAB node 300-T calculates, as the BS value of the pre-emptive BSR, a value obtained by adding the amount B (=D−M) of data retained in the IAB-DU to the resource amount (X2) allocated to the child node 300-C by the UL grant.

In this way, in Variation 2 of the second embodiment, the amount B of data retained in the IAB-DU is calculated based on the amount D of data actually received by the IAB node 300-T, so that the BS value can be calculated more accurately.

Returning FIG. 17, in step S56, the IAB node 300-T transmits, to the parent node 300-P, the pre-emptive BSR including the calculated BS value.

In step S57, the IAB node 300-T ends a series of processing operations.

Variation 2 of Second Embodiment

Variation 2 of the second embodiment will be described. Variation 2 of the second embodiment is an example in which the data amount retained in the IAB-DU is reported by the legacy BSR.

Specifically, the relay node (e.g., the IAB node 300-T) first receives a first legacy BSR from the child node (e.g., the child node 300-C) of the relay node. Secondly, the relay node transmits an uplink grant (UL grant) to the child node. Thirdly, the relay node receives data from the child node. Fourthly, when the relay node receives the first legacy BSR or transmits the uplink grant, the relay node transmits, to the parent node (e.g., the parent node 300-P) of the relay node, a second legacy BSR including, as the buffer size, the data amount retained in the IAB-DU of the relay node.

FIG. 19 is a flowchart illustrating an operation example according to Variation 2 of the second embodiment.

The IAB node 300-T starts processing in step S60 as illustrated in FIG. 19.

Step S61 to step S63 are the same as step S41 to step S43 (FIG. 16) in the second embodiment, respectively.

In step S64, the IAB node 300-T calculates, as a BS value, the data amount retained in the IAB-DU. For example, the IAB-MT (or the IAB-DU) of the IAB node 300-T calculates, as the BS value, data retained in the IAB-DU when a legacy BSR is received from the child node 300-C (step S61) or data retained in the IAB-DU when a UL grant is transmitted to the child node 300-C (step S62).

Here, specifically, the data amount retained in the IAB-DU may be the amount D of data received by the IAB-DU from the child node 300-C. Thus, the IAB-DU may acquire the amount D of data received from the child node 300-C. the data amount retained in the IAB-DU may be calculated by B=D−M in a manner same as and/or similar to Variation 1 of the second embodiment. Thus, the IAB-MT of the IAB node 300-T may acquire the amount D of data received by the IAB-DU and the amount M of data transferred to the IAB-MT.

In step S65, the IAB-MT of the IAB node 300-T transmits, to the parent node 300-P, a legacy BSR including, as the BS value, the data amount retained in the IAB-DU.

In step S66, the IAB node 300-T ends a series of processing operations.

Third Embodiment

A third embodiment will be described. In a manner same as and/or similar to the second embodiment, the third embodiment relates to a calculation method of calculating a BS value of a pre-emptive BSR. However, unlike the second embodiment, the third embodiment relates to a calculation method of a BS value when dual connectivity is configured.

When the IAB node 300-T calculates the BS value of the pre-emptive BSR, how to divide the BS value into a BS value for the master cell group (MCG) and a BS value for the secondary cell group (SCG) may be problematic.

On the other hand, the donor node 200 performs routing configuration on each IAB node 300 in the topology and controls to which IAB node 300 a received packet is transferred.

Thus, the donor node 200 may perform load prediction for each route and perform routing configuration.

The donor node 200 can grasp an actual transmission record of each route based on a measurement report or a status report transmitted from each IAB node 300 and a packet received by the donor node 200.

Thus, in the third embodiment, the donor node 200 configures an allocation rate of the BS value in the IAB node 300. The IAB node 300 divides the BS value of the pre-emptive BSR into a BS value for each cell group (CG) in accordance with the allocation rate, and transmits respective pre-emptive BSRs including the divided BS values to the MCG and the SCG.

Specifically, the relay node (e.g., the IAB node 300-T) first divides the calculated buffer size into a first buffer size and a second buffer size in accordance with the allocation rate. Secondly, the relay node transmits a first pre-emptive BSR including the first buffer size to a first parent node (e.g., the IAB node 300-P1) that is a parent node of the relay node, and transmits a second pre-emptive BSR including the second buffer size to a second parent node (e.g., the IAB node 300-P2) that is a parent node of the relay node. Here, the main cell group (MCG) includes the first parent node, and the secondary cell group (SCG) includes the second parent node. The donor node (e.g., the donor node 200) configures the allocation rate in the relay node.

Configuration Example of Third Embodiment

FIG. 20 is a diagram illustrating a configuration example of a cellular communication system 1 according to the third embodiment.

As illustrated in FIG. 20, the cellular communication system 1 includes two parent nodes 300-P1 and 300-P2 with respect to the IAB node 300-T. The two parent nodes 300-P1 and 300-P2 are also IAB nodes in the topology subordinate to the donor node 200.

Dual connectivity is configured in the IAB node 300-T and the two IAB nodes 300-P1 and 300-P2. Thus, the IAB node 300-T can be connected to the two parent nodes 300-P1 and 300-P2.

In the example illustrated in FIG. 20, the parent node 300-P1 is a cell (or node) included in the MCG, and the parent node 300-P2 is a cell (or node) included in the SCG. The parent node 300-P1 may be included in the SCG and the parent node 300-P2 may be included in the MCG.

Note that the other configurations are basically the same as and/or similar to those of the second embodiment.

Operation Example of Third Embodiment

FIG. 21 is a flowchart illustrating an operation example of the third embodiment.

The donor node 200 starts processing in step S70 as illustrated in FIG. 21.

In step S71, the donor node 200 estimates a transmission ratio of packets for the MCG and the SCG of the IAB nodes 300-T. For example, the donor node 200 may estimate the transmission ratio of packets based on load prediction at the time of routing configuration, a measurement report, a status report, or the like from each IAB node 300.

In step S72, the donor node 200 configures a packet allocation rate in the IAB nodes 300-T. For example, the donor node 200 determines the packet allocation rate based on the packet transmission ratio estimated in step S71. The packet transmission ratio and the packet allocation rate may be the same or different. The CU of the donor node 200 may configure an allocation rate by transmitting the packet allocation rate to the IAB node 300-T using a F1AP message, an RRC message, or the like.

In step S73, the IAB node 300-T calculates a BS value of a pre-emptive BSR and divides the BS value into a BS value for each CG in accordance with the allocation rate. The IAB-DU of the IAB node 300-T may divide the calculated BS value into BS #1 corresponding to the MCG and BS #2 corresponding to the SCG in accordance with the allocation rate and notify the IAB-MT of BS #1 and BS #2. The IAB-MT of the IAB node 300-T may divide the BS value into BS #1 corresponding to the MCG and BS #2 corresponding to the SCG in accordance with the allocation rate. Here, BS=BS #1+BS #2.

In step S74, the IAB-MT of the IAB node 300-T transmits, to each CG, a pre-emptive BSR including the BS value for each CG. For example, the MCG MAC of the IAB-MT transmits a pre-emptive BSR including BS #1 to the parent node 300-P1. For example, the SCG MAC of the IAB-MT transmits a pre-emptive BSR including BS #2 to the parent node 300-P2.

In step S75, the IAB node 300-T ends a series of processing operations.

As described above, in the third embodiment, the IAB node 300-T divides the BS value in accordance with the allocation rate configured by the donor node 200, and transmits the pre-emptive BSRs including the divided BS values to the respective CGs. Accordingly, for example, the IAB node 300-T can report, to each of the parent nodes 300-P1 and 300-P2, the BS value corresponding to load prediction by the donor node 200 or a measurement report or the like from each IAB node 300.

Variation 1 of Third Embodiment

Variation 1 of the third embodiment will be described. Variation 1 of the third embodiment is an example in which the allocation rate for each CG described in the third embodiment is fixed to ½ (or 1:1). Specifically, in this example, the allocation rate is set to ½ of the calculated buffer size.

At the time of the above-described routing configuration, the donor node 200 may perform configuration to balance each route.

Thus, Variation 1 of the third embodiment is an example in which the allocation rate for each CG regarding the BS value is set to ½ in consideration of such a routing configuration performed by the donor node 200.

In Variation 1 of the third embodiment, the allocation rate is fixed at ½, and thus the donor node 200 does not configure, in the IAB node 300-T, the allocation rate in a manner same as and/or similar to the third embodiment. Otherwise, an operation same as and/or similar to that of the third embodiment is performed. The IAB node 300-T divides the calculated BS into a BS value for each CG in accordance with the fixed (or hard-coded) allocation rate. The IAB node 300-T transmits a pre-emptive BSR including the divided BS to each CG.

In Variation 1 of the third embodiment, since the donor node 200 does not configure the allocation rate in the IAB node 300-T, the processing load can be reduced as compared with the third embodiment.

Variation 2 of Third Embodiment

Variation 2 of the third embodiment will be described. In the third embodiment, the donor node 200 determines the allocation rate, but the IAB node 300-T can also determine the allocation rate based on the past actual traffic record for each CG. That is, Variation 2 of the third embodiment is an example in which the IAB node 300-T determines the allocation rate for each CG regarding the BS value. Specifically, the relay node (e.g., the IAB node 300-T) determines the allocation rate based on the history of packets going in and out of the relay node.

FIG. 22 is a flowchart illustrating an operation example according to Variation 2 of the third embodiment.

The IAB node 300-T starts processing in step S80 as illustrated in FIG. 22.

In step S81, the IAB node 300-T records the history of incoming and outgoing packets for each CG. For example, the IAB-DU of the IAB node 300-T records the history of incoming packets for each CG in the memory, and the IAB-MT of the IAB node 300-T records the history of outgoing packets for each CG in the memory.

In step S82, the IAB node 300-T determines the allocation rate to the MCG and the SCG based on the histories. The IAB-MT of the IAB node 300-T may read the histories for a predetermined time in the past recorded in the memory, take an average value for each CG, and determine the allocation rate based on the average value. Alternatively, the IAB-MT of the IAB node 300-T may read the histories of a predetermined number of packets in the past recorded in the memory, acquire the number of packets for each CG, and determine the allocation rate based on the number of packets for each CG. The predetermined time may be several seconds to several tens of seconds, or may be longer than several tens of seconds. The predetermined number of packets may be several tens to several thousands of packets, or may be more than several thousands of packets.

In step S83, the IAB-MT of the IAB node 300-T divides the BS value into a BS value for each CG in accordance with the allocation rate. For example, the IAB-MT of the IAB node 300-T divides the BS value into BS #1 for the MCG and BS #2 for the SCG in accordance with the allocation rate. Here, BS=BS #1+BS #2.

In step S84, the IAB-MT of the IAB node 300-T transmits, to the CGs, pre-emptive BSRs including the BS values divided for the respective CGs. For example, (the MCG MAC of) the IAB-MT of the IAB node 300-T transmits the pre-emptive BSR including BS #1 to the parent node 300-P1 included in the MCG. In addition, (the SCG MAC of) the IAB-MT of the IAB node 300-T transmits the pre-emptive BSR including BS #2 to the parent node 300-P2 included in the SCG.

In step S85, the IAB node 300-T ends a series of processing operations.

Other Variations of Third Embodiment

Although an example in which the donor node 200 transmits the BS value allocation rate to the IAB node 300-T has been described in the above-described third embodiment, the present disclosure is not limited thereto. For example, the donor node 200 may transmit the BS value allocation rate to the parent nodes 300-P1 and 300-P2. In this case, the IAB node 300-T transmits the pre-emptive BSR storing the same BS value to the MCG and the SCG (i.e., the parent nodes 300-P1 and 300-P2). The BS value may be calculated according to the first embodiment and/or the second embodiment. The parent nodes 300-P1 and 300-P2 that have received the pre-emptive BSRs from the IAB node 300-T calculate the BS values for themselves using the allocation rate received from the donor node 200. For example, when receiving "BS" as the BS value stored in the pre-emptive BSR, the parent node 300-P1 obtains the BS value of "BS #1" in accordance with the allocation rate received from the donor node 200. For example, when receiving "BS" as the BS value stored in the pre-emptive BSR, the parent node 300-P2 obtains the BS value of "BS #2" in accordance with the allocation rate received from the donor node 200. Here, "BS"="BS #1"+"BS #2". As a result, the parent nodes 300-P1 and 300-P can transmit UL grants of appropriate resource amounts to the IAB node 300-T.

Although an example in which the IAB node 300-T determines the allocation rate of the BS value and calculates the BS value of the pre-emptive BSR using the allocation rate has been described in Variation 2 of the third embodiment, the present disclosure is not limited thereto. The IAB node 300-T may transmit the determined allocation rate to the MCG and SCG (i.e., the parent nodes 300-P1 and 300-P2). In a manner same as and/or similar to the example described above, the parent nodes 300-P1 and 300-P2 calculate the BS values for themselves in the reported BS value of the pre-emptive BSR using the allocation rate received from the IAB node 300-T. Accordingly, in a manner same as and/or similar to the above-described example, the parent nodes 300-P1 and 300-P2 can transmit UL grants of appropriate resource amounts to the IAB node 300-T.

Other Embodiments

A program causing a computer to execute each type of processing performed by the UE 100, the gNB 200, or the IAB node 300 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing each type of processing to be performed by the UE 100, the gNB 200, or the IAB node 300 may be integrated, and at least part of the UE 100, the gNB 200, or the IAB node 300 may be configured as a semiconductor integrated circuit (a chipset or a System on a chip (SoC)).

Although embodiments have been described in detail with reference to the drawings, a specific configuration is not limited to those described above, and various design modifications and the like can be made without departing from the scope of the present disclosure. All of or a part of the embodiments can be combined together as long as no inconsistencies are introduced.

REFERENCE SIGNS

10: Mobile communication system
100: UE
110: Wireless communicator
120: Controller
200: gNB (donor node)
210: Wireless communicator
220: Network communicator
230: Controller
300 (300-1, 300-2, 300-T): IAB node
300-C: Child node 300-P: Parent node
310: Wireless communicator
320: Controller

The invention claimed is:

1. A communication control method used in a cellular communication system, the communication control method comprising:

determining, by a first relay node, a first buffer size (BS) calculation method among a plurality of buffer size (BS) calculation methods;

in response to a transmission of a pre-emptive Buffer Status Report (BSR) being triggered, calculating, by the first relay node, the buffer size (BS) using the determined first BS calculation method; and transmitting, by the first relay node to a parent node of the first relay node, a pre-emptive Buffer Status Report (BSR) comprising the buffer size.

2. The communication control method according to claim 1, further comprising:

configuring, by an upper node of the first relay node, the first BS calculation method in the first relay node.

3. The communication control method according to claim 1, further comprising:

by the first relay node, transmitting the determined first calculation method to an upper node of the first relay node.

4. The communication control method according to claim 1, wherein the calculating comprises determining, by the first relay node, the first BS calculation method in accordance with a transmission timing of the pre-emptive BSR.

5. A communication control method used in a cellular communication system, the communication control method performed by a relay node, the relay node comprising an Integrated Access and Backhaul (IAB)-Distributed Unit (DU) and an IAB-MT (Mobile-Termination), the method comprising:

receiving, by the LAB-DU of the relay node from a child node of the relay node, a legacy BSR comprising a buffer size amount X1;

transmitting, by the IAB-DU of the relay node to the child node, an uplink grant (UL grant) comprising a resource amount X2;

receiving, by the LAB-DU of the relay node, data from the child node;

transferring, by the IAB-DU of the relay node, the data to the IAB-MT of the relay node;

calculating, by the IAB-MT of the relay node, a buffer size using either (X1−M) or (X2−M), where M is a data amount having been transferred to the IAB-MT of the relay node; and transmitting, by the IAB-MT of the relay node, a pre-emptive BSR comprising the calculated buffer size to a parent node of the relay node.

6. The communication control method according to claim 5, wherein the calculating of the buffer size comprises calculating, by the IAB-MT of the relay node, the buffer size using either (X1+(D−M)) or (X2+(D−M)), where D is a data amount received from the child node.

7. A communication control method used in a cellular communication system, the communication control method performed by a relay node, the relay node comprising an Integrated Access and Backhaul (IAB)-Distributed Unit (DU) and an IAB-MT (Mobile-Termination), the method comprising:

receiving, by the IAB-DU of the relay node, a first legacy BSR from a child node of the relay node;

transmitting, by the IAB-DU of the relay node, an uplink grant (UL grant) to the child node;

receiving, by the IAB-DU of the relay node, data from the child node; and transmitting, by the IAB-MT of the relay node to a parent node of the relay node, a second legacy BSR comprising, in a buffer size, a data amount retained in the IAB-DU of the relay node at a time when the first legacy BSR is received or at a time when the uplink grant is transmitted.

8. A communication control method used in a cellular communication system, the communication control method comprising:

receiving, by a relay node, from a donor node, an allocation rate, the allocation rate configured by the donor node for distributing uplink traffic between a main cell group (MCG) comprising a first parent node of the relay node and a secondary cell group (SCG) including a second parent node of the relay node;

establishing, by the relay node, dual connectivity with the first parent node and the second parent node;

calculating, by the relay node, a total buffer size for data expected to arrive from a child node;

dividing, by the relay node, the calculated total buffer size into a first buffer size and a second buffer size in accordance with an allocation rate; and by the relay node, transmitting a first pre-emptive BSR comprising the first buffer size to the first parent node, and transmitting a second pre-emptive BSR comprising the second buffer size to the second parent node.

9. The communication control method according to claim 8, further comprising:

configuring, by the donor node, the allocation rate in the relay node.

10. The communication control method according to claim 8, wherein the allocation rate is ½ of the calculated buffer size.

11. The communication control method according to claim 8, further comprising:

determining, by the relay node, the allocation rate based on a history of packets going in the relay node and packets going out of the relay node.

* * * * *